United States Patent
Ren et al.

(10) Patent No.: US 11,718,730 B2
(45) Date of Patent: Aug. 8, 2023

(54) POLYMER NANOCOMPOSITES AND METHODS OF MAKING THE SAME

(71) Applicant: Temple University—Of The Commonwealth System of Higher Education, Philadelphia, PA (US)

(72) Inventors: Shenqiang Ren, Haverford, PA (US); Simona Percec, Philadelphia, PA (US); Zhuolei Zhang, Philadelphia, PA (US)

(73) Assignee: Temple University—Of The Commonwealth System of Higher Education, Philadelphia, PA (US)

( * ) Notice: Subject to any disclaimer, the term of this patent is extended or adjusted under 35 U.S.C. 154(b) by 184 days.

(21) Appl. No.: 16/770,825

(22) PCT Filed: Dec. 12, 2018

(86) PCT No.: PCT/US2018/065083
§ 371 (c)(1),
(2) Date: Jun. 8, 2020

(87) PCT Pub. No.: WO2019/143424
PCT Pub. Date: Jul. 25, 2019

(65) Prior Publication Data
US 2021/0179807 A1 Jun. 17, 2021

Related U.S. Application Data

(60) Provisional application No. 62/598,584, filed on Dec. 14, 2017.

(51) Int. Cl.
| | |
|---|---|
| C08K 3/38 | (2006.01) |
| B29B 7/90 | (2006.01) |
| B29C 41/00 | (2006.01) |
| B29C 55/00 | (2006.01) |
| B29C 55/04 | (2006.01) |
| B29C 55/18 | (2006.01) |
| C08F 110/02 | (2006.01) |
| C08J 3/21 | (2006.01) |
| F41H 5/04 | (2006.01) |
| C08K 7/00 | (2006.01) |
| B29K 507/04 | (2006.01) |
| B29K 509/04 | (2006.01) |
| B29L 31/00 | (2006.01) |

(52) U.S. Cl.
CPC .......... *C08K 3/38* (2013.01); *B29B 7/90* (2013.01); *B29C 41/006* (2013.01); *B29C 55/005* (2013.01); *B29C 55/04* (2013.01); *B29C 55/18* (2013.01); *C08F 110/02* (2013.01); *C08J 3/212* (2013.01); *C08K 7/00* (2013.01); *F41H 5/0485* (2013.01); *B29K 2507/04* (2013.01); *B29K 2509/04* (2013.01); *B29L 2031/768* (2013.01); *C08J 2323/06* (2013.01); *C08K 2003/385* (2013.01)

(58) Field of Classification Search
CPC ... C08K 3/38; C08K 2003/385; C08F 110/02; C08J 3/212; C08J 2323/06; B29B 7/90; B29C 55/005; B29C 55/18; B29C 41/006; B29C 55/04; B29K 2507/04; F41H 5/0485
USPC ...................................... 428/411.1
See application file for complete search history.

(56) References Cited

U.S. PATENT DOCUMENTS

| | | | |
|---|---|---|---|
| 9,175,108 B2 | 11/2015 | Sarma | |
| 2010/0064404 A1* | 3/2010 | Es Van | F41H 5/0485 428/113 |
| 2010/0301258 A1* | 12/2010 | Chen | C08J 5/18 428/220 |
| 2014/0217574 A1* | 8/2014 | Kuczynski | H01L 24/83 264/108 |
| 2015/0321408 A1 | 11/2015 | Chen | |
| 2016/0368182 A1* | 12/2016 | Mathur | B29C 55/005 |

FOREIGN PATENT DOCUMENTS

| | | |
|---|---|---|
| CN | 102618955 | 8/2012 |
| CN | 104762683 | 7/2015 |
| WO | 2016005504 | 1/2016 |

OTHER PUBLICATIONS

Cheewawuttipong, W., et al., Thermal and Mechanical Properties of Polypropylene/Boron Nitride Composites, Energy Procedia vol. 34, 2013, pp. 808-817.
Choy, C. L., Fei, Y., & Xi, T. G. (1993). Thermal conductivity of gel-spun polyethylene fibers. Journal of Polymer Science Part B: Polymer Physics, 31 (3), 365-370.
Panaitescu, D., Ciuprina, F., Ciuprina, M., Frone, A., Radovici, C., Ghiurea, M., . . . Plesa, I. (2011). Effects of SiO2 and Al2O3 nanofillers on polyethylene properties. Journal of Applied Polymer Science, 122(3), 1921-1935.
Smith, P., & Lemstra, P. J. (1980). Ultra-high-strength polyethylene filaments by solution spinning/drawing. Journal of Materials Science, 15(2), 505-514.
Zhou (2011) Thermochim. Acta 512(1):183-188.
Zhou et al. (2009) Composites, Part A 40 830-836.
Zhou, et al.Thermal conductivity of boron nitride reinforced polyethylene composites, Materials Research Bulletin 42 (2007) 1863-1873.

* cited by examiner

*Primary Examiner* — Hui H Chin
(74) *Attorney, Agent, or Firm* — Riverside Law LLP

(57) ABSTRACT

A method of fabricating a polymer composite material by mixing a polymer material with a planar material, depositing the mixture on a substrate, and stretching the resulting thin film, is described. Polymer composite materials produced using said method and ballistic resistant materials comprising said polymer composite materials are also described.

19 Claims, 10 Drawing Sheets

POLYMER NANOCOMPOSITES AND METHODS OF MAKING THE SAME

CROSS-REFERENCE TO RELATED APPLICATIONS

The present application claims priority to U.S. Provisional Application No. 62/598,584, filed Dec. 14, 2017, which is incorporated by reference herein in its entirety.

STATEMENT REGARDING FEDERALLY SPONSORED RESEARCH OR DEVELOPMENT

This invention was made with government support under Grant No. W911NF-16-2-0189, awarded by the Army Research Laboratory, and Grant No. W911NF-15-1-0610, awarded by the Army Research Office. The Government has certain rights in the invention.

BACKGROUND OF THE INVENTION

Ultra-high molecular weight polyethylene (UHMWPE) is a linear homo-polymer bearing —$(CH_2-CH_2-)_n$— as the repeat unit and having an average molecular weight more than 3.1 million g/mol (n≈110,000 monomeric units) (Kurtz et al., (1999), Biomaterials 20(18):1659-1688; Muratoglu et al. (1999) Biomaterials 20(16):1463-1470). Its superior mechanical properties derive from the enormous number of covalently linked monomeric units. Despite weak van der Waals interactions between polymer chains, the presence of a large amount of aligned overlaps between neighboring chains can lead collectively to a high intermolecular strength (Kane et al., (2010) J. Biomed. Mater. Res., Part A 92(4): 1500-1509; U.S. Pat. No. 9,175,108). Due to its excellent mechanical properties, chemical stability and effective impact load damping, UHMWPE derived materials have been extensively used in military armor (dos Santos Alves et al., (2005) Polym. Test. 24(1):104-113; Forster et al. (2015) Polym. Degrad. Stab. 114:45-51), orthopedic bearing materials (Sauer & Anthony (1998) Predicting the clinical wear performance of orthopaedic bearing surfaces. Alternative bearing surfaces in total joint replacement, (ASTM International)), and additive manufacturing (U.S. Pat. No. 5,234,652), to name just three examples.

The mechanical and thermal properties of UHMWPE materials are inextricably linked to their crystalline organization. Bulk UHMWPE is primarily comprised of crystalline domains, which are bridged by nanoscale amorphous regions. The crystalline lamellae consist of several rows of tightly packed —$CH_2$—$CH_2$-monomeric units, while the surrounding amorphous regions consist of randomly oriented and entangled polymer chains traversed by tie molecules to interconnect lamellae. Thus, the non-homogeneous nature of bulk UHMWPE accommodates abundant defects, which act as the stress concentration and phonon scattering sites, leading to relatively poor mechanical strength and thermal conductivity (Bracco et al., (2006) Polym. Degrad. Stab. 91(9):2030-2038; Shi et al., (2000) Mater. Sci. Eng., Proc. Conf. 291(1):27-36).

A variety of strategies have been pursued in the quest for improving the mechanical and thermal properties of UHMWPE materials (Panaitescu et al. (2011) J Appl. Polym. Sci. 122(3):1921-1935). For example, manipulating the polymer chain alignment to form the ordered UHMWPE fibers has shown improved mechanical strength and thermal conductivity (Smith & Lemstra (1980) J. Mater. Sci. 15(2): 505-514; Choy et al., (1993) J. Polym. Sci., Part B: Polym. Phys. 31(3):365-370). The high crystallinity in the aligned UHMWPE enables long-range intermolecular order and a decrease in density of defects. As a result, mechanical properties are enhanced, phonon scattering is decreased, and heat transfer efficiency is improved. Doping UHMWPE with nanoparticles has also garnered significant attention. Specifically, improved mechanical properties of UHMWPE composites have been shown through doping of nanoparticles, such as silicon nitride ($Si_3N_4$) (Zhou et al. (2009) Composites, Part A 40(6):830-836), silicon carbide (SiC) (Zhang et al. (2006) Colloids Surf, A 276(1):168-175), boron nitride (BN) (Zhou et al. (2007) Mater. Res. Bull. 42(10): 1863-1873), and aluminum nitride (AlN) (Zhou (2011) Thermochim. Acta 512(1):183-188). However, producing polymer composites that simultaneously possess high mechanical strength and thermal conductivity maintains a challenge.

There is need in the art for polymer composites having enhanced mechanical strength and thermal conductivity, and methods to produce such composites. The present invention satisfies this unmet need.

SUMMARY OF THE INVENTION

In one aspect, the present invention relates to a polymer composite material, comprising: a polymer material having a plurality of polymer chains, wherein the polymer chains are highly aligned; and a planar material, wherein the amount of the planar material is between 10 wt % and 40 wt % of the composite material. In one embodiment, the polymer material comprises a polymer selected from the group consisting of a polyethylene, a polyamide, an aramid, a polycarbonate, a polystyrene, a fluoropolymer, a polyester, an epoxy, a polybenzazole, an combinations or co-polymers thereof. In one embodiment, the polymer material is selected from the group consisting of polyethylene, low density polyethylene, high density polyethylene, and ultra-high molecular weight polyethylene. In one embodiment, the planar material is selected from the group consisting of graphene, hexagonal boron nitride, silicene, germanene, phosphorene, $MoS_2$, $TiS_2$, $WS_2$, $VS_2$, $TiSe_2$, $MoSe_2$, $WSe_2$, $TaSe_2$, $NbSe_2$, $NiTe_2$, $Bi_2Te_3$, and combinations thereof. In one embodiment, the planar material is graphene, hexagonal boron nitride, or a combinations thereof. In one embodiment, the amount of planar material is about 20 wt % of the composite material. In one embodiment, the degree of alignment of the polymer chains is between 80% and 100%.

The present invention relates in part to a ballistic resistant material comprising the inventive polymer composite material. The present invention also relates in part to armor comprising the ballistic resistant material comprising the inventive polymer composite material.

In another aspect, the present invention relates to a method of fabricating a polymer composite material, the method comprising the steps of providing a polymer material and a planar material; mixing the polymer material with the planar material at a temperature greater than 200° C. to create a polymer mixture; depositing the polymer mixture on a substrate to create a polymer thin film; and stretching the polymer thin film to create a polymer composite material. In one embodiment, the step providing a polymer material and a planar material further comprises the step of sonicating the planar material. In one embodiment, the step of mixing the polymer material with the planar material further comprises the step of adding a solvent the polymer mixture. In one embodiment, the solvent is selected from the group consisting of long-chain saturated hydrocarbons, orthodichlorobenzene, xylenes, quinoline, and glycerine. In one embodiment, the method further comprises the step of heating the substrate to a temperature greater than 100° C. In one embodiment, the step of stretching the polymer thin film to create an polymer composite material comprises the steps of fixing opposite ends of the thin film to a support structure; and pulling the ends of the thin film in opposite directions with a constant force and a controlled speed. In one embodiment, the step of stretching the polymer thin film to create an polymer composite material comprises the steps of heating at least one roller to a temperature between 100° C. and 300° C.; and rolling the polymer thin film under a constant force and a controlled speed. In one embodiment, the polymer thin film is stretched at temperature of between 100° C. and 300° C. In one aspect, the invention relates to a polymer composite material formed by the methods of the invention.

BRIEF DESCRIPTION OF THE DRAWINGS

The following detailed description of various embodiments of the invention will be better understood when read in conjunction with the appended drawings. For the purpose of illustrating the invention, there are shown in the drawings illustrative embodiments. It should be understood, however, that the invention is not limited to the precise arrangements and instrumentalities of the embodiments shown in the drawings.

FIGS. 2A through 2J, depicts the morphology and structure of BN-UHMWPE composite sheets. FIGS. 2A, 2B, and 2C are a schematic illustration of the alignment procedure of BN-UHMWPE composite sheets. FIG. 2D shows the chemical structure of UHMWPE and BN. FIG. 2E is a TEM image of exfoliated BN nanosheets. FIG. 2F is an AFM image of exfoliated BN nanosheets with a thickness of 3.2 nm. FIG. 2G is an SEM image of aligned BN-UHMWPE composite sheets; inset: SEM image of BN-UHMWPE composite sheets. FIG. 2H shows photographs of a 2 µm thick BN-UHMWPE composite sheet wrapped around a glass tube; towards the bottom of the photo is a 2 µm thick BN-UHMWPE composite sheet, showing the semitransparency of the composite material. FIG. 2I is an AFM image of aligned BN-UHMWPE composite sheets; the inset is an AFM image of the BN-UHMWPE composite sheets. FIG. 2J shows the XRD patterns of bulk BN, exfoliated BN, bulk UHMWPE, BN-UHMWPE melt and aligned BN-UHMWPE sheets.

FIGS. 3A through 3F, depicts the effect of alignment on the mechanical properties of an exemplary composite film. FIG. 3A is a comparison of the compressive Young's modulus of UHMWPE film, BN-UHMWPE composite sheets and bulk BN-doped UHMWPE sheets. FIG. 3B shows force-displacement curves of BN-UHMWPE composite sheets aligned at different temperatures from 373 K to 473 K. FIG. 3C shows the increase in the Young's modulus of BN-UHMWPE composite sheets as a function of the degree of alignment. FIG. 3D is an XPM image of an exemplary BN-UHMWPE composite sheet before alignment. FIG. 3E is an XPM image of an exemplary BN-UHMWPE composite sheet after alignment. FIG. 3F compares the calculated average Young's modulus with respective error bars of BN-UHMWPE composite sheets and aligned BN-UHMWPE composite sheets.

FIGS. 4A and 4B, shows force-displacement curves of the BN-doped UHMWPE composites. FIG. 4A is a plot of force-displacement curves of few-layered BN-doped UHMWPE; the inset is the corresponding optical image. FIG. 4B is a plot of force-displacement curves of bulk BN-doped UHMWPE; the inset is the corresponding optical image.

FIGS. 5A through 5D, depicts the effect of BN concentration on the mechanical properties of aligned BN-UHMWPE composite sheets. FIG. 5A is a plot of the compressive stress-strain curves of aligned BN-UHMWPE composite sheet with various BM concentrations ranging between 0 and 40 wt %. FIG. 5B is a plot of the compressive Young's modulus of aligned BN-UHMWPE composite sheets as a function of BN concentration. FIG. 5C is a plot of tensile stress-strain curves of aligned BN-UHMWPE composite sheets at different BN concentrations. Figure D is a plot of the tensile Young's modulus and elongation at break of aligned BN-UHMWPE composite sheets as a function of BN concentration.

FIGS. 6A through 6D, depicts XPM images of exemplary composite materials with differing BN contents. FIG. 6A is an XPM image of an exemplary composite material with no BN content. FIG. 6B is an XPM image of an exemplary composite material with a BN content of 10 wt %. FIG. 6C is an XPM image of an exemplary composite material with a BN content of 20 wt %. FIG. 6D is an XPM image of an exemplary composite material with a BN content of 40 wt %.

FIGS. 7A through 7E, depicts the setup and results of classical MD simulations on exemplary BN-UHMWPE composites. FIG. 7A shows the initial configuration of the pre-aligned pure UHMWPE; the system contains 47,916 monomeric units. FIG. 7B shows the initial configuration of the pre-aligned BN doped UHMWPE; six BN sheets (equalling a 20 wt % concentration) are uniformly distributed within the polyethylene sheets. FIG. 7C shows the monomeric unit—monomeric unit separations of the equilibrium structures, demonstrating a high degree of polymer alignment representative of the experimentally investigated pure and composite films. FIG. 7D shows the polyethylene chain angle distributions of the equilibrium structures; at inset are the equilibrated configurations of pure UHMWPE and BN doped UHMWPE at room temperature. FIG. 7E is a three-dimensional plot of the elastic moduli of the aligned films along the X-axis, Y-axis and Z-axis at room temperature based on the MD calculations (chains were aligned along Z and sheets were parallel to the Y-Z plane).

FIGS. 8A through 8D, depicts temperature effects on the thermo-mechanical properties of exemplary composite materials. FIG. 8A is a plot of the experimentally measured elastic moduli of UHMWPE and aligned BN-UHMWPE composite sheets as a function of temperature. FIG. 8B is a plot of the elastic moduli of the aligned films along the X-, Y-, and Z-axes at various temperatures, based on the MD simulations. The elastic modulus E increases with temperature, as was also observed in the experimental measurements. FIG. 8C is a plot showing the variation of the normalized order parameter with temperature, characterizing the monomer-monomer alignment of polyethylene with respect to the film direction. While not wishing to be bound by any particular scientific theory, the temperature-induced increase in polymer alignment may be responsible for the increased modulus at higher temperature. FIG. 8D is a plot of the cooling curves of UHMWPE film and aligned BN-UHMWPE composite sheet under the same conditions; at inset are near-infrared images of UHMWPE film (right) and aligned BN-UHMWPE composite sheets (left) at the initial and cooled stage.

DETAILED DESCRIPTION

It is to be understood that the Figures and descriptions of the present invention have been simplified to illustrate elements that are relevant for a clear understanding of the present invention, while eliminating, for the purpose of clarity, many other elements found in polymer composites and methods of making. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

As used herein, each of the following terms has the meaning associated with it in this section. Unless defined otherwise, all technical and scientific terms used herein generally have the same meaning as commonly understood by one of ordinary skill in the art to which this invention belongs.

The articles "a" and "an" are used herein to refer to one or to more than one (i.e. to at least one) of the grammatical object of the article. By way of example, "an element" means one element or more than one element.

As used herein, the term "about" will be understood by persons of ordinary skill in the art and will vary to some extent depending on the context in which it is used. As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Methods of the Invention

Figure 1:
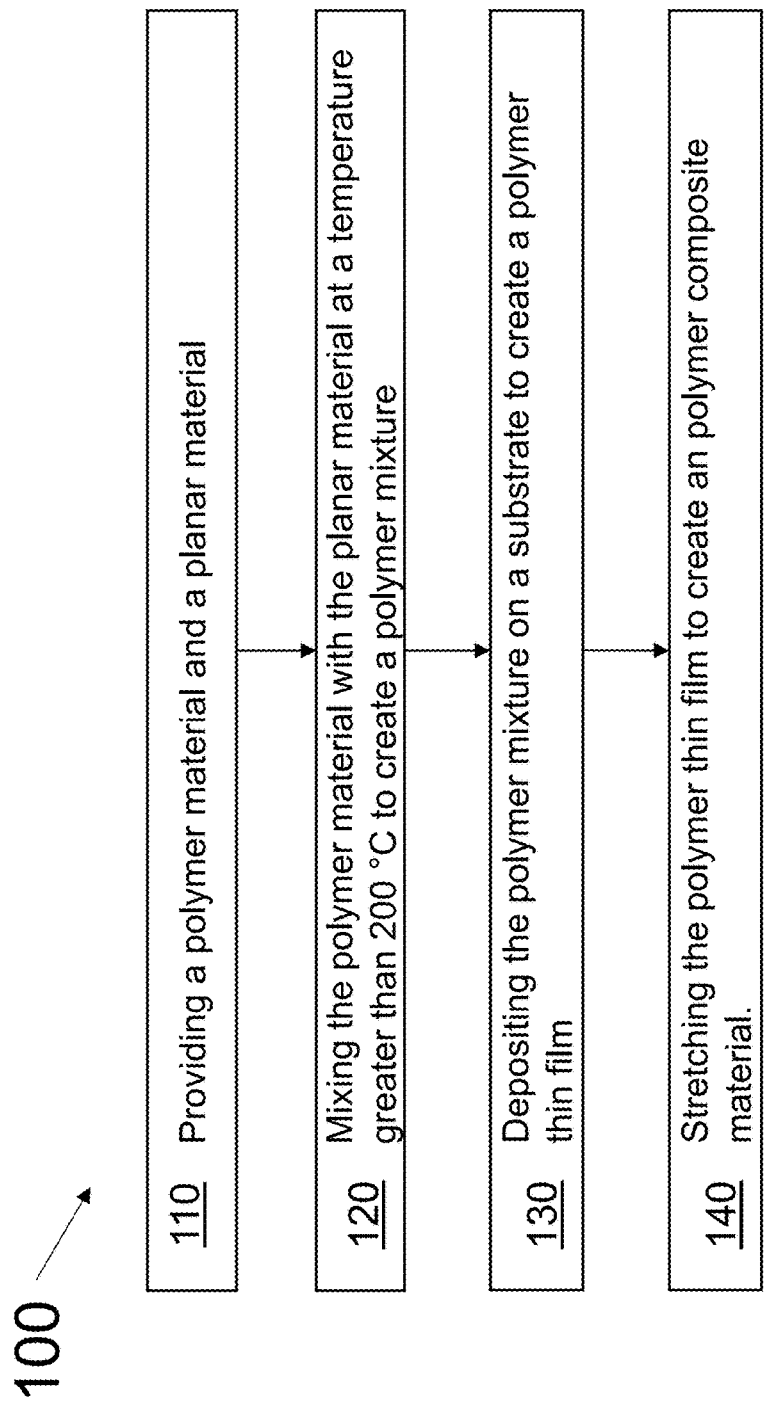
FIG. 1 is a schematic of an exemplary method for the fabrication of a composite material of the present invention.

In one aspect, the present invention relates to a method of fabricating a polymer composite material. Exemplary process 100 is shown in FIG. 1. In step 110, a polymer material and a planar material are provided. In step 120, the polymer material is mixed with the planar material at a temperature greater than 200° C. to create a polymer mixture. In step 130, the polymer mixture is deposited on a substrate to create a polymer thin film. In step 140, the polymer thin film is stretched to create an polymer composite material.

In step 110, there is no limitation to the type of polymer material provided. In one embodiment, the polymer material comprises a single polymeric fiber. In one embodiment, the polymer material comprises a plurality of polymeric fibers. In one embodiment, the polymer material comprises a plurality of fibers in the form of a woven fabric or a non-woven fabric. In one embodiment, the polymer material comprises a plurality of polymeric fibers formed into a solid structure of any dimension or mass.

The polymer material may comprise any polymer. Exemplary polymer materials include, but are not limited to, polyolefin fibers such as high density polyethylene (HDPE), low density polyethylene (LDPE), extended chain polyolefin fibers, high molecular weight polyethylene (HMWPE) fibers, ultra-high molecular weight polyethylene (UHMWPE) fibers, polypropylene fibers, ultra-high molecular weight polypropylene fibers; aramid fibers such as para-aramid fibers, polyamide fibers, polyimide fibers, and polyamide-imide fibers; polycarbonate polybutylene fibers; polystyrene fibers; polyester fibers such as polyethylene terephthalate fibers, polyethylene naphthalate fibers, and polycarbonate fibers; polyacrylate fibers; polybutadiene fibers; polyurethane fibers; extended chain polyvinyl alcohol fibers; fibers formed from fluoropolymers such as polytetrafluoroethylene (PTFE); epoxy fibers; phenolic resin polymeric fibers; polyvinyl chloride fibers; organosilicon polymeric fibers; extended chain polyacrylonitrile fibers; polybenzazole fibers such as polybenzoxazole (PBO) and polybenzothiazole (PBT) fibers; liquid crystal copolyester fibers; rigid rod fibers such as M5® fibers; and combinations thereof. In some embodiments of the invention, the polymer material comprises a copolymer or a block copolymer. In one embodiment, the polymer material is thermoplastic or thermosetting.

In one embodiment, the polymer material is a high-strength, high tensile modulus fibers such as may be used in the manufacture of ballistic resistant fabrics by one of skill in the art. Exemplary polymeric fibers useful for the formation of ballistic resistant fabrics include, but are not limited to, polyethylene, particularly extended chain polyethylene fibers, aramid fibers, polybenzazole fibers, liquid crystal copolyester fibers, polypropylene fibers, particularly highly oriented extended chain polypropylene fibers, polyvinyl alcohol fibers, polyacrylonitrile fibers and rigid rod fibers such as M5® fibers.

In one embodiment, the polymer material comprises extended chain polyethylenes having molecular weights of at least 500,000 g/mol, at least one million g/mol, or between two million and five million g/mol. In one embodiment, the polymer material comprises extended chain polyethylenes having an averate molecular weight of more than 3.1 million g/mol. Such extended chain polyethylene (ECPE) fibers may be grown in solution spinning processes such as described in U.S. Pat. No. 4,137,394 or 4,356,138, which are incorporated herein by reference, or may be spun from a solution to form a gel structure, such as described in U.S. Pat. Nos. 4,551,296 and 5,006,390, which are also incorporated herein by reference. In one embodiment, the polymer material comprises polyethylene fibers sold under the trademark SPECTRA® from Honeywell International Inc. SPECTRA® fibers are well known in the art and are described, for example, in U.S. Pat. Nos. 4,623,547 and 4,748,064.

In one embodiment, the polymer material comprises aramid (aromatic polyamide) or para-aramid fibers. In one embodiment, the aramid fibers are commercially available, such as those described in U.S. Pat. No. 3,671,542. In one embodiment, the polymer material comprises poly(p-phenylene terephthalamide) filaments produced commercially by DuPont Corporation under the trade name of KEVLAR®. In one embodiment, the polymer material comprises poly(m-phenylene isophthalamide) fibers produced commercially by DuPont under the trade name NOMEX® and or produced commercially by Teijin under the trade name TWARON®.

In one embodiment, the polymer material comprises polybenzazole fibers, for example those described in U.S. Pat. Nos. 5,286,833, 5,296,185, 5,356,584, 5,534,205 and 6,040,050, each of which are incorporated herein by reference. In one embodiment, the polybenzazole fibers are ZYLON® brand fibers from Toyobo Co. In one embodiment, the polymer material comprises liquid crystal copolyester fibers such as those described, for example, in U.S. Pat. Nos. 3,975,487; 4,118,372 and 4,161,470, each of which is incorporated herein by reference.

In one embodiment, the polymer material comprises polypropylene fibers. In one embodiment, the polymer material comprises highly oriented extended chain polypropylene (ECPP) fibers as described in U.S. Pat. No. 4,413,110, which is incorporated herein by reference. In one embodiment, the polymer material comprises polyvinyl alcohol (PV—OH) fibers such as those described, for example, in U.S. Pat. Nos. 4,440,711 and 4,599,267 which are incorporated herein by reference. In one embodiment, the polymer material comprises polyacrylonitrile (PAN) fibers such as those described, for example, in U.S. Pat. No. 4,535,027, which is incorporated herein by reference.

In one embodiment, the polymer material comprises rigid rod fibers. In one embodiment, the polymer material comprises M5® fibers. M5® fibers are manufactured by Magellan Systems International of Richmond, Va. and are described, for example, in U.S. Pat. Nos. 5,674,969, 5,939,553, 5,945,537, and 6,040,478, each of which is incorporated herein by reference.

In one embodiment, the polymer material comprises a combination of at least two types of polymers. In one non-limiting example, the polymer material may comprises fibrous layers formed from a combination of polyethylene fibers and aramid fibers.

In one embodiment, the polymer material is a linear homo-polymer. In one embodiment, the polymer material comprises more than 25,000 repeat units in a single polymer chain. In one embodiment, the polymer material comprises more than 50,000 repeat units. In one embodiment, the polymer material comprises more than 75,000 repeat units. In one embodiment, the polymer material comprises more than 100,000 repeat units.

The planar material can be any planar material known to one of skill in the art. In one embodiment, the planar material is a substantially flat material of atomic-level or near-atomic-level thickness. In one embodiment, the planar material is substantially circular in shape. In one embodiment, the diameter of the planar material is between 100 nm and 300 nm. In one embodiment, the planar material has a continuous flat surface with a compact structure. In one embodiment, the surface of the planar material has no defects.

Exemplary planar materials include, but are not limited to, graphene, graphyne, hexagonal boron nitride, silicene, germanene, black phosphorous (phosphorene), transition metal dichalcogenides, and combinations thereof. Exemplary transition metal dichalcogenides include $MoS_2$, $TiS_2$, $WS_2$, $VS_2$, $TiSe_2$, $MoSe_2$, $WSe_2$, $TaSe_2$, $NbSe_2$, $NiTe_2$, and $Bi_2Te_3$, and can be produced by any method known to those of skill in the art.

In one embodiment, the step of mixing the polymer material with a planar material at a temperature greater than 200° C. to create a polymer mixture is preceded by the step of sonicating the planar material to exfoliate the planar material into individual layers or into few-layered structures. In one embodiment, the planar material is sonicated in an organic solvent. In one embodiment, the planar material is sonicated in a protic solvent such as methanol, ethanol, isopropanol, and the like. In one embodiment, the planar material is sonicated for at least 60 min. In one embodiment, the planar material is sonicated for at least 120 min. In one embodiment, the planar material is sonicated for at least 180 min. In one embodiment, the planar material is sonicated for at least 240 min. In one embodiment, following sonication, the planar material is precipitated from solution, such as via addition of a second solvent. In one embodiment, the second solvent is acetone. In one embodiment, the precipitation is aided by a process known by one of skill in the art, such as centrifugation. In one embodiment, centrifugation is conducted at 5000 RPM.

In one embodiment, the planar material is hexagonal boron nitride (h-BN). In one embodiment, the h-BN is multi-layered. In one embodiment, the h-BN is mono-layered. In one embodiment, the h-BN is few-layered.

In one embodiment, in step 120, the amount of the planar material added to the polymer material is between 1 wt % and 99 wt % relative to the total amount of polymer material and planar material. In one embodiment, the amount of the planar material is between 1 wt % and 90 wt %. In one embodiment, the amount of the planar material is between 10 wt % and 80 wt %. In one embodiment, the amount of the planar material is between 10 wt % and 70 wt %. In one embodiment, the amount of the planar material is between 10 wt % and 60 wt %. In one embodiment, the amount of the planar material is between 10 wt % and 50 wt %. In one embodiment, the amount of the planar material is between 10 wt % and 40 wt %. In one embodiment, the amount of the planar material is about 10 wt %. In one embodiment, the amount of the planar material is about 15 wt %. In one embodiment, the amount of the planar material is about 20 wt %. In one embodiment, the amount of the planar material is about 25 wt %. In one embodiment, the amount of the planar material is about 30 wt %. In one embodiment, the amount of the planar material is about 35 wt %. In one embodiment, the amount of the planar material is about 40 wt %.

There is no particular limit on how the polymer material and the planar material are mixed. In one embodiment, the polymer material and the planar material are mixed in the absence of a solvent. In one embodiment, the polymer material and the planar material are mixed in the presence of a solvent. In one embodiment, the solvent is a high-boiling solvent. Exemplary solvents include, but are not limited to, long chain saturated hydrocarbons, halogenated hydrocarbons such as monochlorobenzene and orthodichlorobenzene, unsubstituted aromatic hydrocarbons such as benzene, alkyl-substituted aromatic hydrocarbons such as toluene, ethylbenzene, and ortho-, meta- or para-xylene, aromatic heteroaromatics such as quinoline and pyridine, cumene, high boiling ethers, gamma butyrolactone, ethyl lactate, methyl 2-hydroxyisobutyrate, PGMEA, cyclohexanone, tetrahydrofurfuryl alcohol, propylene carbonate, 2-heptanone, NMP, diacetone alcohol, ionic liquids, glycerine, and combinations thereof.

In one embodiment, the polymer material and the planar material are mixed at a high temperature. In one embodiment, the polymer material and the planar material are mixed at temperature less than or equal to the boiling point of the solvent. In one embodiment, the polymer material and the planar material are mixed at a temperature less than or equal to the melt temperature of the polymer material. In one embodiment, the polymer material and the planar material are mixed at a temperature greater than the melt temperature of the polymer material. In one embodiment, the polymer material and the planar material are mixed at a temperature greater than about 100° C. In one embodiment, the polymer material and the planar material are mixed at a temperature greater than about 110° C. In one embodiment, the polymer material and the planar material are mixed at a temperature greater than about 120° C. In one embodiment, the polymer material and the planar material are mixed at a temperature greater than about 130° C. In one embodiment, the polymer material and the planar material are mixed at a temperature greater than about 140° C. In one embodiment, the polymer material and the planar material are mixed at a temperature greater than about 150° C. In one embodiment, the polymer material and the planar material are mixed at a temperature greater than about 160° C. In one embodiment, the polymer material and the planar material are mixed at a temperature greater than about 170° C. In one embodiment, the polymer material and the planar material are mixed at a temperature greater than about 180° C. In one embodiment, the polymer material and the planar material are mixed at a temperature greater than about 190° C. In one embodiment, the polymer material and the planar material are mixed at a temperature greater than about 200° C. In one embodiment, the polymer material and the planar material are mixed at a temperature greater than about 210° C. In one embodiment, the polymer material and the planar material are mixed at a temperature greater than about 220° C. In one embodiment, the polymer material and the planar material are mixed at a temperature greater than about 230° C. In one embodiment, the polymer material and the planar material are mixed at a temperature greater than about 240° C. In one embodiment, the polymer material and the planar material are mixed at a temperature greater than about 250° C.

In step 130, the substrate can be of any material known to those of skill in the art. In one embodiment, the substrate comprises a material that is not reactive with the polymer material or the planar material. Exemplary inert substrates include perlite, alumina, silica glass, vermiculite, aluminum silicate, magnesium silicate, and glass.

In one embodiment, the step of depositing the polymer mixture on a substrate to create a polymer thin film is preceded by the step of heating the substrate prior to deposition of the polymer mixture. In one embodiment, the substrate is heated to a temperature lower than or equal to the boiling point of any solvent in the polymer mixture. In one embodiment, the substrate is heated to a temperature lower than or equal to the melt temperature of the polymer material. In one embodiment, the substrate is heated to a temperature lower than or equal to the temperature of the polymer mixture. In another embodiment, the substrate is heated to a temperature greater than the temperature of the polymer mixture. In one embodiment, the substrate temperature is between about 100° C. and about 250° C. In one embodiment, the substrate temperature is between 125° C. and 225° C. In one embodiment, the substrate temperature is between 150° C. and 200° C. In one embodiment, the substrate temperature is about 150° C. In one embodiment, the substrate temperature is about 160° C. In one embodiment, the substrate temperature is about 170° C. In one embodiment, the substrate temperature is about 180° C. In one embodiment, the substrate temperature is about 190° C. In one embodiment, the substrate temperature is about 200° C.

The polymer mixture may be deposited on the substrate using any method known to one of skill of the art, such as, but not limited to, spin coating, pad printing, doctor blading, drop casting, screen printing, ink-jet printing, roll coating, using a paint brush, and the like.

In one embodiment, depositing the polymer mixture on the substrate converts the polymer mixture to a thin film. In one embodiment, depositing the polymer mixture on the substrate, such as a heated substrate, causes any solvent present to evaporate. In one embodiment, the evaporation of solvent causes the polymer mixture to form a thin film.

In step 140, stretching the thin film may comprise any method known in the art, such as hot drawing, hot stretching, spin drawing, or roller drawing. Stretching at a specific temperature and speed causes the polymer chains to align in the direction of stretching. In one embodiment, the thin film is stretched until continuous application of force no longer changes the length of the film. In one embodiment, the thin film is stretched for at least 30 seconds. In one embodiment, the thin film is stretched for at least 60 seconds. In one embodiment, the thin film is stretched for at least 90 seconds. In one embodiment, the thin film is stretched for at least 120 seconds.

In one embodiment, stretching the polymer thin film results in elongation of the thin film. In one embodiment, the thin film is stretched to at least 150% of its original length. In one embodiment, the thin film is stretched to at least 200% of its original length. In one embodiment, the thin film is stretched to at least 250% of its original length. In one embodiment, the thin film is stretched to at least 300% of its original length. In one embodiment, the thin film is stretched to at least 350% of its original length. In one embodiment, the thin film is stretched to at least 400% of its original length. In one embodiment, the thin film is stretched to at least 450% of its original length. In one embodiment, the thin film is stretched to at least 500% of its original length. In one embodiment, the thin film is stretched to at least 550% of its original length.

In one embodiment, the thin film is fixed at opposite ends to a support structure. In one embodiment, the support structure can be any structure known to one of skill in the art. In one embodiment, the support structure comprises a frame. In one embodiment, the support structure comprises a structure having a clasp. In one embodiment, the opposite ends of the thin film are pulled in opposing directions with a constant for ace and a controlled speed.

In one embodiment, the polymer thin film is stretched at a temperature above the melting point of the polymer material. As one of ordinary skill in the art would recognize, the melting point of a polymer varies with the type of polymer, the molecular weight distribution of the polymer, the crystalline morphology of the film, and the relative composition of any additional material, such as a planar material, contained within. In one embodiment, the temperature of the thin film is increased at a constant rate.

In one embodiment, the step of stretching the polymer thin film comprises applying a constant force to opposite ends of the polymer thin film. In one embodiment, the force applied in the stretching of the thin film depends on the dimensions of the thin film. In one embodiment, the constant force is a force between 0.05 N and 0.8 N. In one embodiment, the constant force is a force between 0.1 N and 0.8 N. In one embodiment, the constant force is a force of about 0.2 N.

In one embodiment, the polymer thin film is stretched at a temperature below the melt temperature of the polymer material. In one embodiment, the thin film is stretched at a temperature between 100° C. and 300° C. In one embodiment, the polymer thin film is stretched at a temperature between 120° C. and 250° C. In one embodiment, the polymer thin film is stretched at a temperature between 130° C. and 225° C. In one embodiment, the polymer thin film is stretched at a temperature between 140° C. and 200° C.

In one embodiment, the stretching is conducted in a heat-controlled chamber. In one embodiment, the film is heated by moving rolls which may in turn be heated by an electrical resistance method, by passage over a heated plate, through a heated liquid, a heated gas, or the like.

In one embodiment, multiple stages of stretching are applied to the polymer thin film. In one embodiment, the polymer film is stretched in the same direction during each stage. In one embodiment, the stretching is conducted in a continuous, semi-continuous, or batch process.

In one embodiment, stretching the polymer thin film causes the polymer chains to become highly aligned. In one embodiment, stretching the polymer thin film causes the polymer chains to become highly crystalline, enabling long-range intermolecular order and a decrease in density of defects. In one embodiment, the relative degree of alignment can determined from the length of the thin film following stretching: when the thin film is stretched to its maximum possible length, the relative degree of alignment is 100%. In one embodiment, halting the stretching process before the thin film reaches its maximum length results in a film with a relative degree of alignment of less than 100%. In one embodiment, the relative degree of alignment of the polymer chains is between 1% and 100%. In one embodiment, the relative degree of alignment of the polymer chains is between 25% and 100%. In one embodiment, the relative degree of alignment of the polymer chains is between 50% and 100%. In one embodiment, the relative degree of alignment of the polymer chains is between 60% and 100%. In one embodiment, the relative degree of alignment of the polymer chains is between 70% and 100%. In one embodiment, the relative degree of alignment of the polymer chains is between 80% and 100%. In one embodiment, the relative degree of alignment of the polymer chains is between 90% and 100%. In one embodiment, the relative degree of alignment of the polymer chains is about 100%.

Composite Materials

In one aspect, the present invention relates to a composite material formed using the fabrication method described herein. In another aspect, the present invention relates to a polymer composite material comprising a polymer material having a plurality of polymer chains, wherein the polymer chains are highly aligned, and a planar material, wherein the amount of the planar material is between 10 wt % and 40 wt %. The invention is in part based on the unexpected discovery that incorporation of a planar material into a polymer composite material imparts significantly improved mechanical properties.

There is no limitation to the type of polymer material. In one embodiment, the polymer material comprises a plurality of polymer chains. In one embodiment, the polymer material comprises a single polymeric fiber. In one embodiment, the polymer material comprises a plurality of polymeric fibers. In one embodiment, the polymer material comprises a plurality of fibers in the form of a woven fabric or a non-woven fabric. In one embodiment, the polymer material comprises a plurality of polymer chains formed into a solid structure of any dimension or mass. The polymer material may comprise any polymer disclosed herein or any other polymer known to those of skill in the art.

In one embodiment, the polymer chains of the polymer material are highly aligned. In one embodiment, the degree of alignment of the polymer chains is between 1% and 100%. In one embodiment, the degree of alignment of the polymer chains is between 25% and 100%. In one embodiment, the degree of alignment of the polymer chains is between 50% and 100%. In one embodiment, the degree of alignment of the polymer chains is between 60% and 100%. In one embodiment, the degree of alignment of the polymer chains is between 70% and 100%. In one embodiment, the degree of alignment of the polymer chains is between 80% and 100%. In one embodiment, the degree of alignment of the polymer chains is between 90% and 100%. In one embodiment, the degree of alignment of the polymer chains is about 100%.

In one embodiment, the polymer composite material comprises a planar material. The planar material may be any planar material discussed herein. There is no particular limit to the method of manufacture of the planar material. In one embodiment, the height of the planar material is significantly lower than the length and width.

In one embodiment, the composition of planar material in the polymer composite material affects the thermomechanical properties of the polymer composite material. In one embodiment, the amount of the planar material in the polymer composite material is between 1 wt % and 99 wt %. In one embodiment, the amount of the planar material is between 1 wt % and 90 wt %. In one embodiment, the amount of the planar material is between 10 wt % and 80 wt %. In one embodiment, the amount of the planar material is between 10 wt % and 70 wt %. In one embodiment, the amount of the planar material is between 10 wt % and 60 wt %. In one embodiment, the amount of the planar material is between 10 wt % and 50 wt %. In one embodiment, the amount of the planar material is between 10 wt % and 40 wt %. In one embodiment, the amount of the planar material is about 10 wt %. In one embodiment, the amount of the planar material is about 15 wt %. In one embodiment, the amount of the planar material is about 20 wt %. In one embodiment, the amount of the planar material is about 25 wt %. In one embodiment, the amount of the planar material is about 30 wt %. In one embodiment, the amount of the planar material is about 35 wt %. In one embodiment, the amount of the planar material is about 40 wt %.

In one embodiment, the polymer composite material is a thin film. There are no particular limits to the length and width of the thin film, as would be understood by one of skill in the art. In one embodiment, the polymer composite material is a film with a thickness between 10 nm and 100 µm. In one embodiment, the polymer composite material is a film with a thickness between 100 nm and 10 µm. In one embodiment, the polymer composite material is a film with a thickness between 1 µm and 10 µm. In one embodiment, the polymer composite material is a film with a thickness of about 1 µm. In one embodiment, the polymer composite material is a film with a thickness of about 2 µm. In one embodiment, the polymer composite material is a film with a thickness of about 3 µm. In one embodiment, the polymer composite material is a film with a thickness of about 4 µm. In one embodiment, the polymer composite material is a film with a thickness of about 5 μm. In one embodiment, the polymer composite material is a film with a thickness of about 6 μm. In one embodiment, the polymer composite material is a film with a thickness of about 7 μm. In one embodiment, the polymer composite material is a film with a thickness of about 8 μm. In one embodiment, the polymer composite material is a film with a thickness of about 9 μm. In one embodiment, the polymer composite material is a film with a thickness of about 10 μm. In one embodiment, the thin film polymer composite material has a wrinkled surface morphology.

There is no particular limit on the shape or dimensions of the polymer composite material of the invention. Exemplary forms that the polymer composite material may take include, but are not limited to, slices, sticks, wires, fibers, bricks, fabrics, thin films, and the like.

In one embodiment, the polymer composite material has a high degree of crystallinity. In one embodiment, the van der Waals interactions between individual particles of the planar material within the polymer composite material are reduced relative to the pristine planar material.

In one embodiment, the compressive Young's modulus of the polymer composite material is between 2.0 GPa and 4.5 GPa. In one embodiment, the compressive Young's modulus is between 2.5 GPa and 4.5 GPa. In one embodiment, the compressive Young's modulus is of the polymer composite material is between 2.7 GPa and 4.5 GPa. In one embodiment, the compressive Young's modulus is about 2.5 GPa. In one embodiment, the compressive Young's modulus is about 2.6 GPa. In one embodiment, the compressive Young's modulus is about 2.7 GPa. In one embodiment, the compressive Young's modulus is about 2.8 GPa. In one embodiment, the compressive Young's modulus is about 2.9 GPa. In one embodiment, the compressive Young's modulus is about 3.0 GPa. In one embodiment, the compressive Young's modulus is about 3.1 GPa. In one embodiment, the compressive Young's modulus is about 3.2 GPa. In one embodiment, the compressive Young's modulus is about 3.3 GPa. In one embodiment, the compressive Young's modulus is about 3.4 GPa. In one embodiment, the compressive Young's modulus is about 3.5 GPa. In one embodiment, the compressive Young's modulus is about 3.6 GPa. In one embodiment, the compressive Young's modulus is about 3.7 GPa. In one embodiment, the compressive Young's modulus is about 3.8 GPa. In one embodiment, the compressive Young's modulus is about 3.9 GPa. In one embodiment, the compressive Young's modulus is about 4.0 GPa. In one embodiment, the compressive Young's modulus is about 4.1 GPa. In one embodiment, the compressive Young's modulus is about 4.2 GPa. In one embodiment, the compressive Young's modulus is about 4.3 GPa. In one embodiment, the compressive Young's modulus is about 4.4 GPa. In one embodiment, the compressive Young's modulus is about 4.5 GPa. In one embodiment, the compressive Young's modulus of the polymer composite material depends on the amount of planar material in the polymer composite material.

In one embodiment, the tensile Young's modulus of the polymer composite material can be obtained from the yielding point. In one embodiment, the tensile Young's modulus of the polymer composite material depends at least in part on the content of the planar material in the polymer composite. In one embodiment, the tensile Young's modulus of the polymer composite material is between 1.0 and 2.0 GPa. In one embodiment, the tensile Young's modulus is about 1.0 GPa. In one embodiment, the tensile Young's modulus is about 1.1 GPa. In one embodiment, the tensile Young's modulus is about 1.2 GPa. In one embodiment, the tensile Young's modulus is about 1.3 GPa. In one embodiment, the tensile Young's modulus is about 1.4 GPa. In one embodiment, the tensile Young's modulus is about 1.5 GPa. In one embodiment, the tensile Young's modulus is about 1.6 GPa. In one embodiment, the tensile Young's modulus is about 1.7 GPa. In one embodiment, the tensile Young's modulus is about 1.8 GPa. In one embodiment, the tensile Young's modulus is about 1.9 GPa. In one embodiment, the tensile Young's modulus is about 2.0 GPa.

In one embodiment, the elongation at break of the polymer composite material can be obtained from the breaking point. In one embodiment, the elongation of the polymer composite material depends at least in part on the content of the planar material in the polymer composite. In one embodiment, the elongation at break of the polymer composite material is between 250% and 550%. In one embodiment, the elongation at break of the polymer composite material is about 250%. In one embodiment, the elongation at break of the polymer composite material is about 300%. In one embodiment, the elongation at break of the polymer composite material is about 350%. In one embodiment, the elongation at break of the polymer composite material is about 400%. In one embodiment, the elongation at break of the polymer composite material is about 450%. In one embodiment, the elongation at break of the polymer composite material is about 500%. In one embodiment, the elongation at break of the polymer composite material is about 550%.

In one embodiment, the polymer composite material has a higher thermal conductivity than a pristine polymer material, or a polymer material not comprising a planar material. In one embodiment, the rate of heat diffusion is higher in the polymer composite material compared to a pristine polymer material. In one embodiment, the difference in temperature is greater than 2 K after 90 seconds. In one embodiment, the difference in temperature is greater than 2.2 K after 90 seconds.

Ballistic Resistant Materials

In one aspect, the present invention relates in part to a ballistic resistant material comprising a polymer composite material made using the methods described elsewhere herein. For example, the ballistic resistant material may comprise flexible, soft armor articles; rigid, hard armor articles; or fabrics comprising the polymer composite material described herein.

Exemplary flexible, soft articles include, but are not limited to, garments such as vests, pants, hats, or other articles of clothing, or covers or blankets used by military personnel to defeat a number of ballistic threats, such as 9 mm full metal jacket (FMJ) bullets, and a variety of fragments generated due to explosion of hand-grenades, artillery shells, Improvised Explosive Devices (IED) and other such devises encountered in military and peace keeping missions. As used herein, "soft" or "flexible" armor is armor that does not retain its shape when subjected to a significant amount of stress and is incapable of being free-standing without collapsing. In one embodiment, garments comprising the polymer composite material of the invention may be formed through methods conventionally known in the art. In one embodiment, the garment is formed by adjoining the ballistic resistant articles of the invention with an article of clothing. For example, a vest may comprise a generic fabric vest that is adjoined with the ballistic resistant structures of the invention, whereby the inventive articles are inserted into strategically placed pockets. As used herein, the terms "adjoining" or "adjoined" are intended to include attaching, such as by sewing or adhering and the like, as well as un-attached coupling or juxtaposition with another fabric, such that the ballistic resistant articles comprising the polymer composite material of the invention may optionally be easily removable from the vest or other article of clothing.

Exemplary hard armor articles include, but are not limited to, helmets, panels for military vehicles, or protective shields, which have sufficient mechanical strength so that the hard armor article maintains structural rigidity when subjected to a significant amount of stress and is capable of being freestanding without collapsing. In one embodiment, the polymer composite material can be cut into a plurality of discrete sheets and stacked for formation into an article or they can be formed into a precursor which is subsequently used to form an article. Such techniques are well known in the art.

EXPERIMENTAL EXAMPLES

The invention is now described with reference to the following Examples. These Examples are provided for the purpose of illustration only, and the invention is not limited to these Examples, but rather encompasses all variations that are evident as a result of the teachings provided herein.

Example 1: Flexible and Mechanically Strong Polymer Sheets from Aligned Ultra-High Molecular Weight Polyethylene Nanocomposites Here, hexagonal boron nitride (h-BN) is used as a dopant in a UHMWPE matrix based on its high thermal conductivity, excellent mechanical properties, low coefficient of thermal expansion (CTE), nontoxicity, and high electrical resistivity over a wide range of operating temperatures (Ishida Rimdusit (1998) Thermochim. Acta 320(1):177-186). This nanocomposite of highly aligned UHMWPE chains and BN nanosheets possesses enhanced mechanical properties at elevated temperatures. The improved mechanical properties at high temperature result from changes of segmental order parameters in monomeric to monomeric units. The mechanical properties and thermal conductivity of BN-UHMWPE composite are determined by the number of layers and loading concentration of BN sheets as well as the chain alignment in the UHMWPE matrix
Materials and Methods At the start, the BN nanosheets are sonicated to exfoliate into few layers following a known procedure (Coleman et al. (2011) Science 331(6017):568-571). Briefly, BN powder (100 mg) was added to 100 mL isopropanol. The resulting suspension was subjected to sonication for 240 min to effect exfoliation. The exfoliated BN nanosheets were then precipitated via the addition of acetone, and the mixture was centrifuged at a 5000 RPM to further separate the BN nanosheets from the solution. The nanosheets were then dispersed in o-dichlorobenzene (o-DCB) for further mixing with UHMWPE. UHMWPE (0.2 g) is mixed with o-DCB and then heated on a hotplate at 493 K until fully dissolved. The exfoliated BN nanosheets are then transferred into the UHMWPE solution (in a proportion of 0 to 40 wt. %) and mixed uniformly by stirring. After that, the solution is drop cast on a heated glass substrate. The solvent on the substrate is evaporated gradually on a hotplate at a temperature of 170° C., so that the film is spread uniformly over the glass substrate. In a second alignment stage, the thin film is pulled from the glass substrate at room temperature and cut into 0.5 cm×2 cm pieces. Both ends of the thin film are fixed and stretched with a force of 0.2 N at an elevated temperature (413 K to 473 K).

The optical images were recorded by an Olympus BX51 microscope and processed by a computer. SEM images were taken from FEI Quanta450FEG. X-ray diffraction analysis was carried out using a Rigaku CCD diffractometer with Cu-Kα radiation (λ=1.542 Å). AFM images were taken from Bruker dimension icon atomic force microscopy equipped with Cr/Pt-coated Si probe (radius <25 nm, resonant frequency, 13 kHz). Compressive force-displacement curves and XPM images were taken from Hysitron TI 950 TribolnDenter/Nanoindenter. Tensile stress-strain curves were recorded by INSTRON 5940 Series Single Column Table Top Systems. Instrumented indentation tests were performed using a TI980 TribolnDenter with a diamond Berkovich tip. The tip was used to make indentation in the radial direction. Measurements were performed in displacement control mode, with a maximum indent depth of approximately 100 nm. A drift correction was performed prior to indentation. The loading rate was 20 nm s$^{-1}$ with a holding time of 5 seconds.

The polyethylene chain containing 47,916 monomeric units (with a molar mass of 1,344,523 mol/g) was modeled using united atom model, which treats each $CH_2$ unit as a single bead. To mimic the experimental conditions of highly aligned polymer films, the pure UHMWPE was built instructively to contain a large proportion of alignment in the initial configuration by covalently linking adjacent polymer chains. Additionally, six BN sheets were uniformly intercalated within the PE chains to build a composite containing 20 wt % BN. Classical MD simulations were then performed using the LAMMPS software package (Plimpton (1995) J. Comput. Phys. 117(1):1-19) with the following interaction potential:

$$V(r, \theta, \phi) = \frac{1}{2}k_r(r-r_0)^2 + \frac{1}{2}k_\theta(\theta-\theta_0)^2 + \sum_{n=1}^{5} A_n \cos^{n-1}(\phi) + 4\varepsilon\left[\left(\frac{\sigma}{r}\right)^{12} - \left(\frac{\sigma}{r}\right)^{12}\right]$$

The united atom level parameters of Pieter J in't Veld and G. C. Rutledge (in't Veld & Rutledge (2003) Macromolecules 36(19):7358-7365) with dihedral parameters taken from the literature (Hossain et al. (2010) Polymer 51(25): 6071-6083) were used to describe the above interaction potential. The van der Waals interactions were truncated at 10 Å and the tail corrections on pressure and energy beyond this cutoff were included. All simulations in the present work were carried out using periodic boundary conditions in all three directions. The initial structures were subjected to an equilibration protocol described below: initial velocities were randomly assigned to each particle according to the Maxwell-Boltzmann distribution with a target temperature of 298 K. To avoid unusual repulsions between adjacent overlapped atoms due to the initial lattice based UHMWPE construction, A short simulation was performed at room temperature in microcanonical (NVE) ensemble by limiting maximum atomic displacements to 0.05 A at any time-step. A constant pressure-temperature (NPT) simulation was performed for 50 ns with a time step of 2 fs and temperature and pressure coupling constants of 0.1 and 1 ps, respectively. During the NPT, the density of UHMWPE and BN-dispersed UHMWPE was optimized corresponding to experimental conditions. After the NPT, equilibrium dimensions of the simulation box are roughly 11.2×8.6×23.9 nm³ for pure UHMWPE and 14.0×9.1×21.6 nm³ for BN dispersed UHMWPE polymer matrices.

For the non-equilibrium mechanical loading simulations, strain was applied in steps of 0.001 and the systems were relaxed at each step for 400 ps under a constant volume-temperature (NVT) ensemble. The elastic modulus was computed as the slope of stress-strain relation by fitting the data in the strain regime of 0 to 0.01. The order parameter was calculated as $S_2=½\langle (\hat{t}\cdot n)^2-1\rangle$, where $\hat{t}$ is the tangent representing monomer-monomer vector C—C (see inset of FIG. 4(c)) and n is the director of the polymer fibril axis. The parameter $S_2$ would assume a value of 1.0 if the C—C bonds vectors in UHMWPE are perfectly aligned, 0 for randomly aligned and −0.5 for perpendicularly aligned bonds with respect to fibril axis.

The Results of the Experiments Will Now be Discussed

Figure 2:
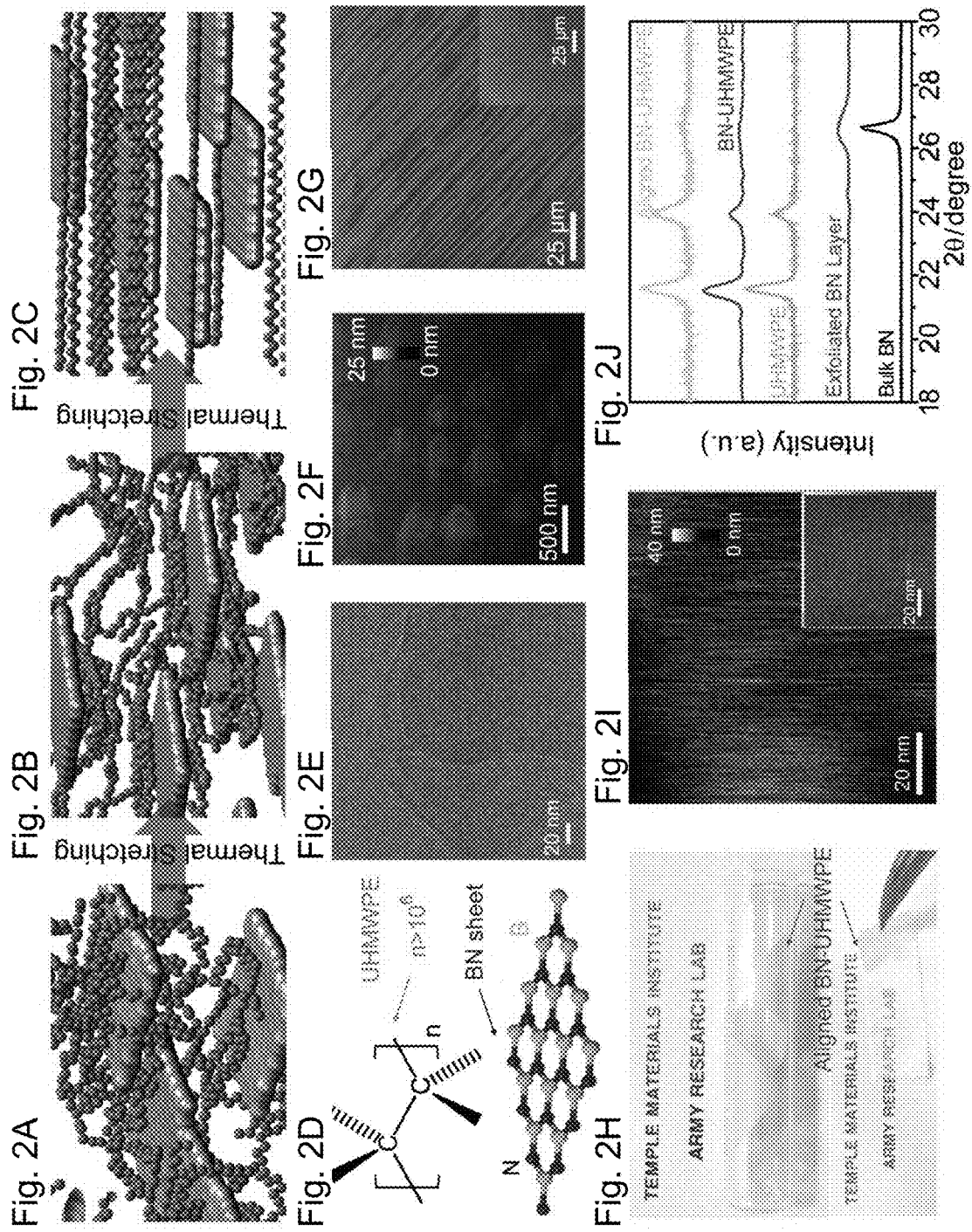
FIG. 2, comprising

To facilitate the uniform mixing between BN and UHMWPE, both components were mixed at an elevated temperature to form a composite gel. Then, a composite sheet was mechanically aligned at high temperature to increase its crystallinity. Accordingly, a solution-based processing technique was applied to fabricate a BN-UHMWPE composite (FIGS. 2A through 2D), in which the liquid-exfoliated BN layers are uniformly mixed with the UHMWPE matrix in 1,2-dicholorobenzene at 493 K to form a gel (Coleman et al. (2011) Science 331(6017):568-571). Bulk BN transforms to ultrathin nanosheets with an average thickness of about 3.2 nm after exfoliation (FIGS. 2E and 2F). The gel is then coated onto a glass substrate to form thin film composites, which are subsequently peeled off to generate free-standing BN-UHMWPE sheets (FIG. 2A). The free-standing sheets are further processed under thermo-mechanical stretching (FIGS. 2B and 2C) with an applied optimum force of 0.2 N in a temperature range of 413 K to 473 K with a controlled speed. The aligned BN-UHMWPE sheets show a wrinkle-like surface morphology due to the alignment of polymer chain segments (FIG. 2G), while the untreated sheet exhibits an isotropic structure (the inset of FIG. 2G). The BN-UHMWPE composite maintains its flexibility and semitransparency after the alignment (FIG. 2H). The morphological changes induced by the thermo-mechanical treatment were probed by using atomic force microscopy (AFM). The results revealed in FIG. 2I show highly oriented polymer fibers with respect to the isotropic structure before alignment (the inset of FIG. 2I). The X-ray diffraction pattern of the pristine sheets shown in FIG. 2J displays two distinct peaks at 21.44° and 23.99°, corresponding to the (110) and (200) planes, respectively. (20) The positions of these peaks are unchanged after the alignment of UHMWPE composite sheets. However, the intensity of the (200) peak increases significantly after the alignment, indicating the enhancement of crystallinity. In addition, the full width at half maximum (FWHM) of the (002) peak of BN phase in the X-ray diffraction pattern increases while its intensity decreases, suggesting reduced van der Waals interactions between BN layers within the UHMWPE matrix (FIG. 2G).

Figure 3:
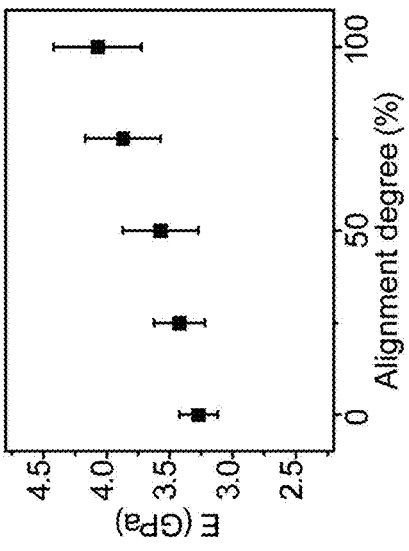
FIG. 3, comprising
Figure 3:
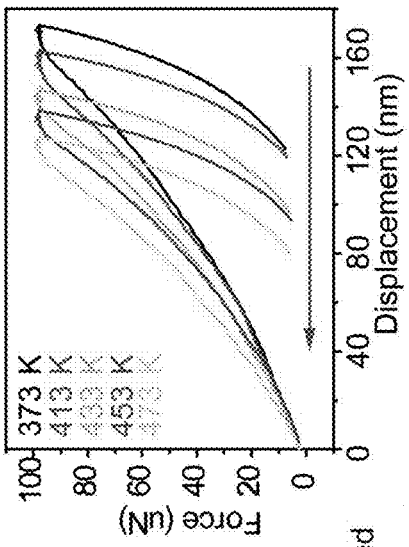
Figure 3:
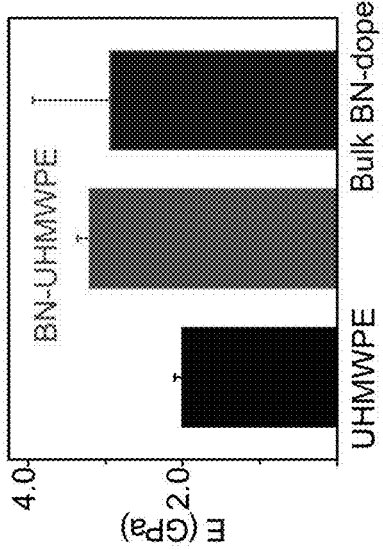
Figure 3:
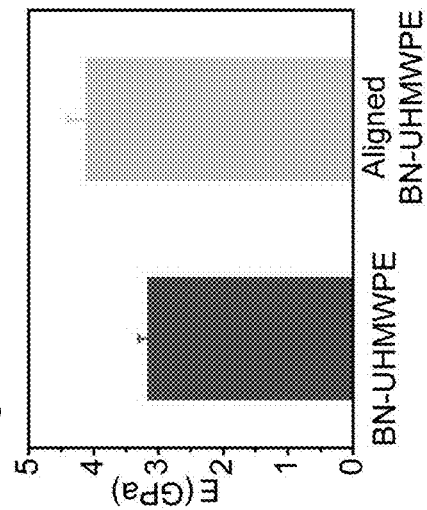
Figure 3:
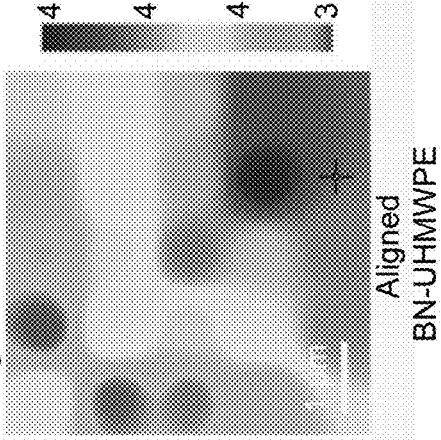
Figure 3:
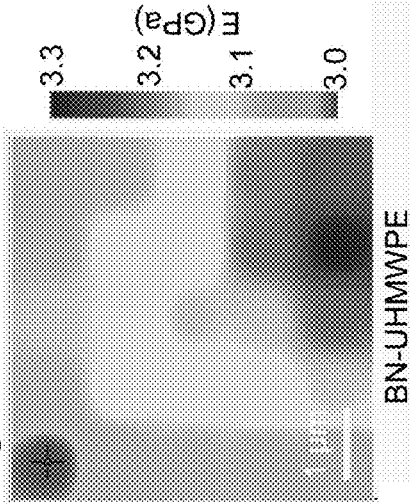
Figure 4:
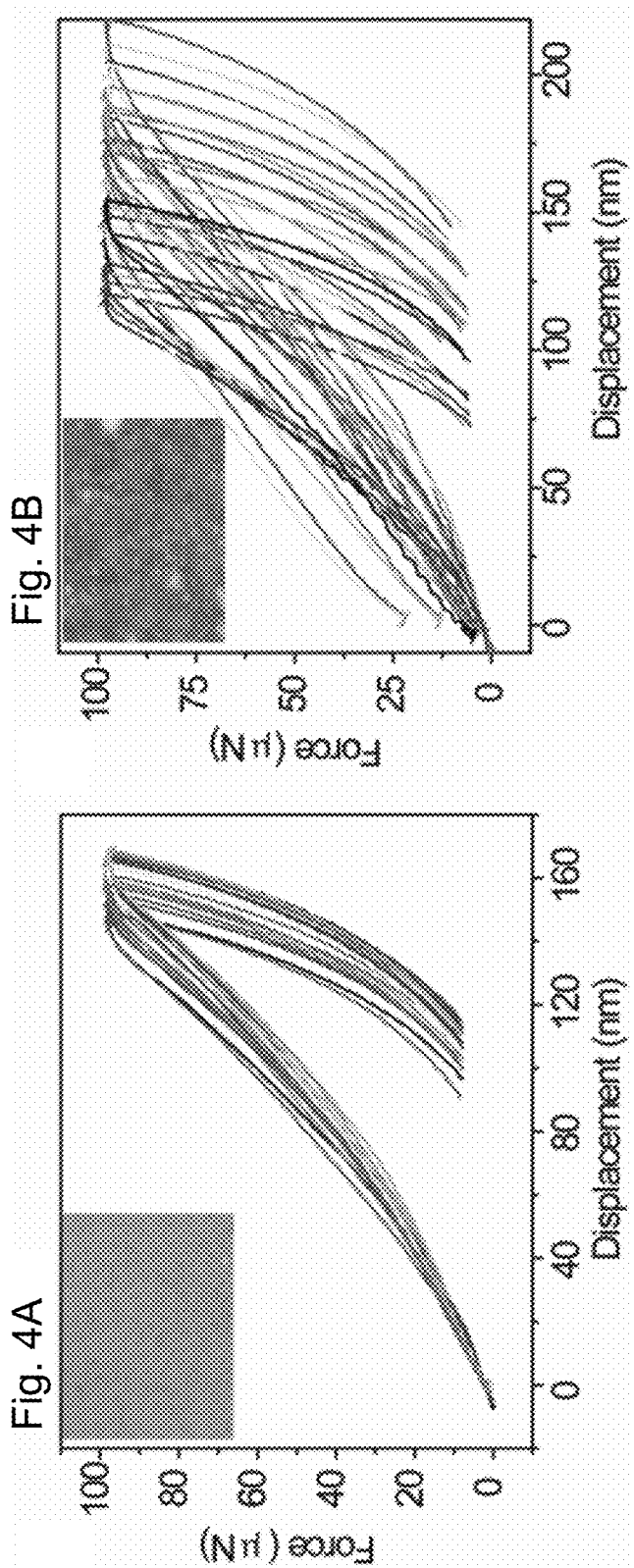
FIG. 4, comprising

In order to quantify the effect of doping and alignment on the mechanical properties of UHMWPE and BN-UHMWPE composite sheets, nanoindentation measurements were performed by applying an external load through a nanoindenter tip at the sheet surface. The Young's modulus, E, of UHMWPE and the BN-UHMWPE composite can be obtained from the force-displacement behavior as follows:

$$\frac{1}{E_r} = \frac{(1-v^2)}{E} + \frac{(1-v_i^2)}{E_i}, E_r = \frac{\sqrt{\pi}}{2\beta}\frac{S}{\sqrt{A}},\qquad(1)$$

where A is the contact surface area at peak load, S is the initial unloading contact stiffness calculated using $$S = \frac{dP}{dh},$$

β is an indenter geometry dependent dimensionless parameter[20], $E_r$ is the reduced modulus, E is the Young's modulus of the indenter, and v and vi are the Poisson's ratio of the specimen and the indenter, respectively (Singh & Samanta (2015) Mater. Today: Proc. 2(4-5):1381-1387). The measurements are conducted in the force-control mode, and the maximum force applied on the BN-UHMWPE composite sheet is 100 μN. FIG. 3A displays the Young's modulus of UHMWPE, BN-UHMWPE and bulk BN doped UHMWPE sheets, indicating that the BN-UHMWPE sheets exhibit the highest elastic modulus (FIG. 4 presents the corresponding force-displacement curves) (Green et al., (1976) J. Chem. Phys. 64(2):656-662). For the bulk BN doped UHMWPE sheets, the force-displacement curves exhibit discrete steps, indicating a non-uniform distribution of BN particles. In contrast, the uniform force-displacement curves of BN-UHMWPE sheets suggest homogeneously distributed stress relaxation throughout the material. This is facilitated by the large contact area between exfoliated BN nanosheets and the polymer chains, leading to an optimum elastic modulus. Without exfoliation, the bulk BN particles (white dots, the inset of FIG. 4B) tend to aggregate within the UHMWPE matrix in contrast to the homogeneously distributed exfoliated BN nanosheets. As a result, the Young's modulus of the bulk BN doped UHMWPE sheets fluctuates largely (>50%), as compared to the small fluctuations observed for the BN-UHMWPE nanosheets.

The force-displacement curves are shown in FIG. 3B for thermo-mechanically treated BN-UHMWPE sheets containing a large proportion of aligned polymer chains under different processing temperatures. An applied tensile stress along the aligned BN-UHMWPE composite sheets causes the covalent bonds within the chain to stretch. The thermally-treated BN-UHMWPE polymer sheets are characterized by different degrees of alignment depending on the processing temperature. The stretching behavior is elastic and the polymer chains of UHMWPE move back to their original position after returning to low temperature. It can be speculated that a higher temperature facilitates the rearrangement of the orientation of UHMWPE chains under external tensile strain, increasing the material's stiffness. Therefore, the Young's modulus of BN-UHMWPE nanocomposite increases with the degree of alignment (FIG. 3C), as indicated by the force-displacement curves. To confirm the validity of above considerations, ultra-fast extreme property mapping (XPM) of UHMWPE and BN-UHMWPE composite sheets was used to obtain spatial distribution maps for the elastic modulus (FIGS. 3D and 3E). The measurement is applied on the surface of BN-UHMWPE sheets, spanning an area of 5×5 μm² with a 5×5 grid. The corresponding XPM images of the sheets before and after alignment are shown in FIGS. 3D and 3E, respectively. The aligned BN-UHMWPE sheets exhibit an average modulus E=~4.1 GPa, which is larger than that of the isotropic sheet at ~3.0 GPa. The calculated average modulus of these sheets is presented in FIG. 3F, where both the aligned and isotropic sheets confirm the enhancement of the mechanical properties after the polymer alignment.

Figure 5:
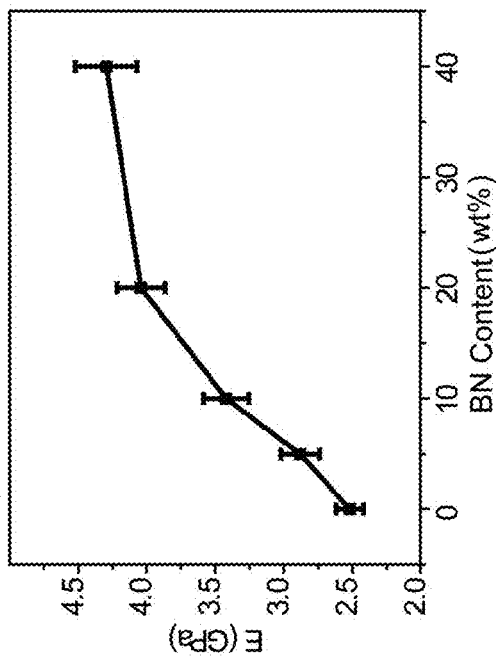
FIG. 5, comprising
Figure 5:
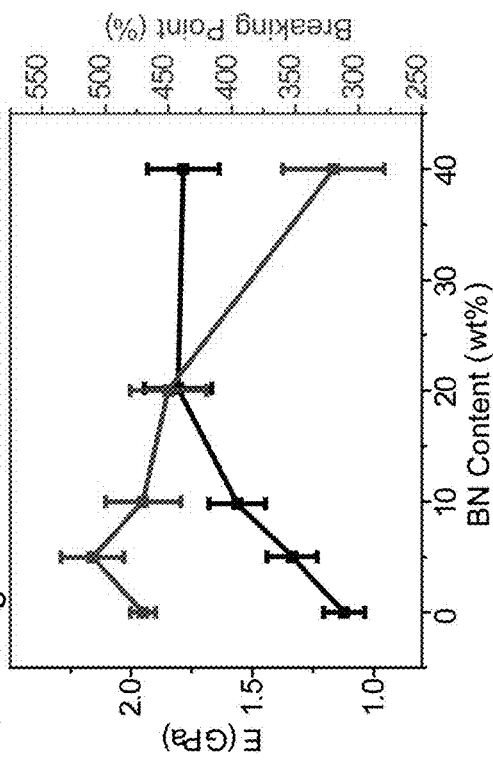
Figure 5:
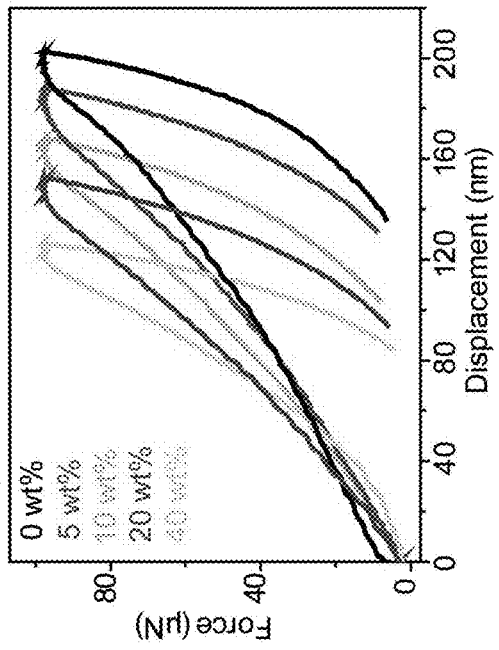
Figure 5:
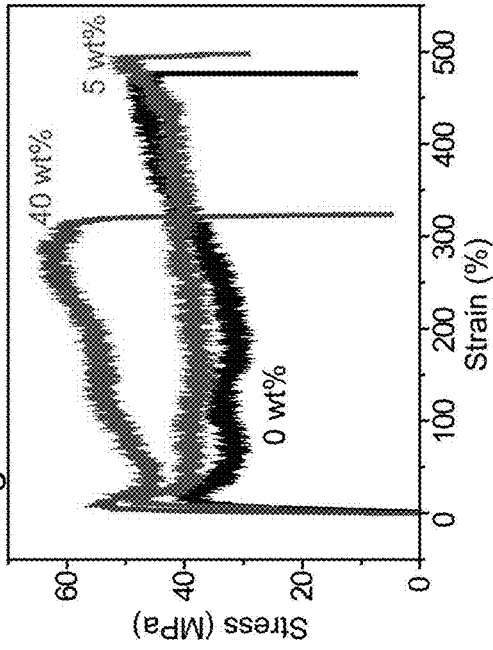
Figure 6:
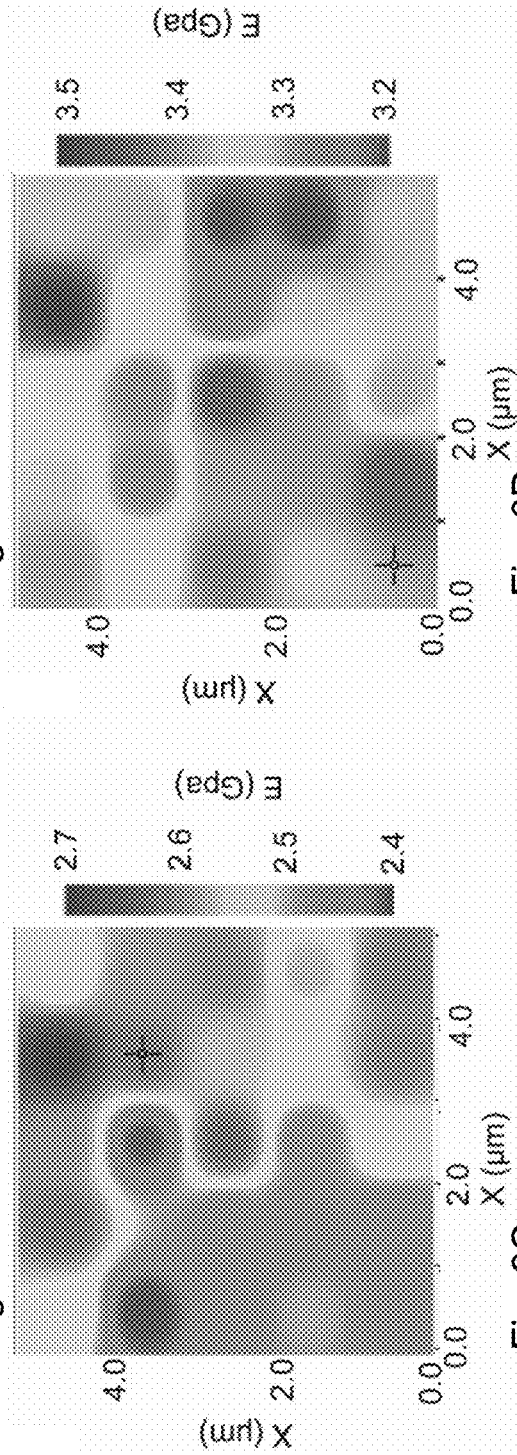
FIG. 6, comprising
Figure 6:
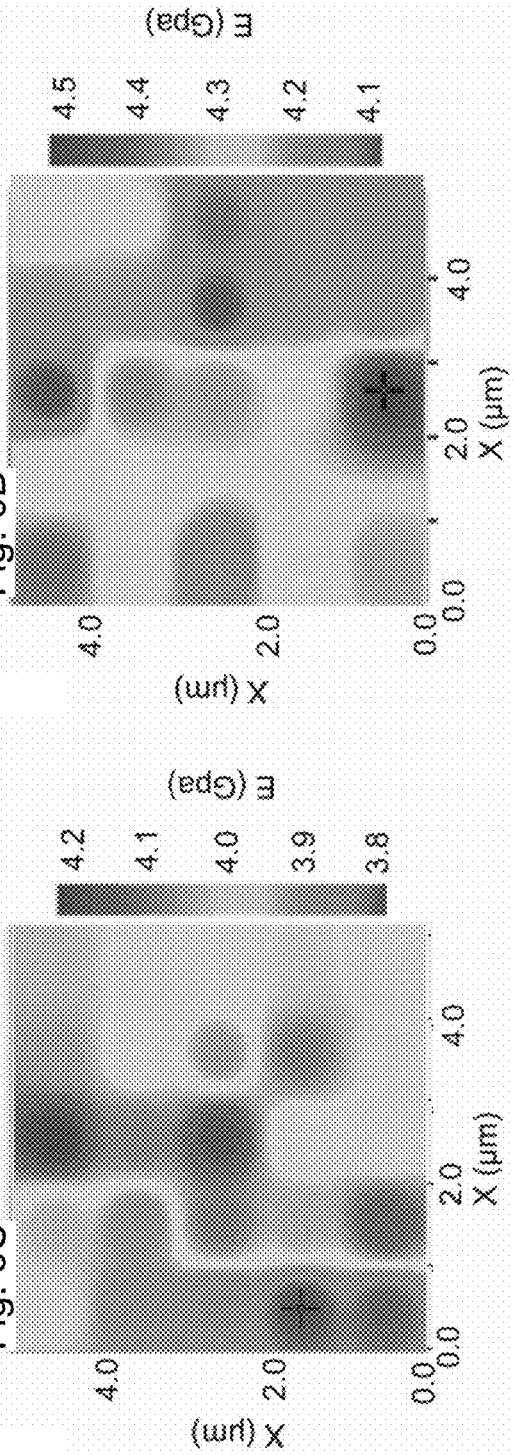

In addition to the polymer chain alignment effect, the effect of BN concentration on the elastic modulus of aligned BN-UHMWPE sheets was also investigated. Specifically, BN loading concentrations from 0 to 40 wt % were used, and both the compressive and tensile modulus of BN-UHMWPE sheets were determined (FIG. 5A). The compressive Young's modulus of BN-UHMWPE composite increases from 2.7 GPa at 0 wt % BN to 3.9 GPa at 40 wt % BN. Furthermore, the ultra-fast extreme property mapping measurements (shown in FIG. 6) reveal a uniformly-distributed elastic modulus with small variations of ±0.3 GPa. Moreover, the average Young's modulus of BN-UHMWPE composite also increases with the increasing the concentration of BN, due to higher rigidity of BN nanosheets compared to the polymer matrix. The stress-strain curve, another important tensile mechanical property of the BN-UHMWPE composite is presented in FIG. 5B. The stress-strain behavior reveals similar trends of initial linear elasticity, non-linear transition and collapse stages (Hoy (2011) J. Polym. Sci., Part B: Polym. Phys. 49(14):979-984). The tensile Young's modulus of BN-UHMWPE composite sheets is obtained from the yielding point, and the elongation is obtained from the breaking point. There is a significant increase of tensile Young's modulus with the incorporation of BN nanosheets for loadings below 20 wt %. The above results suggest that the exfoliated BN nanosheets can contribute considerably to the overall mechanical properties, despite destabilizing the polymer-polymer alignment. On the other hand, the alignment of polymer chains on the surface of BN nanosheets enables the transfer of mechanical load across the interface between BN nanosheets and UHMWPE matrix, which contributes to the increase of Young's modulus of the composite. Not surprisingly, further increase of BN loading beyond 20 wt % is seen to have no significant effect on the mechanical properties. The above result can be understood as a consequence of the disrupting effect of BN on polymer-polymer interactions. Unlike the elastic modulus, the elongation at break of BN-UHMWPE slightly increases with BN content up to 5 wt % and significantly decreases with further increase of BN. Below 5 wt % BN, the strain for breaking increases slightly due to the interaction between BN and UHMWPE matrix. Though the strain for the breaking decreases, the incorporation of more than 5 wt % BN nanosheets can act as the crack terminator leading to small elongation of the composite sheets at the breaking point.

Figure 7:
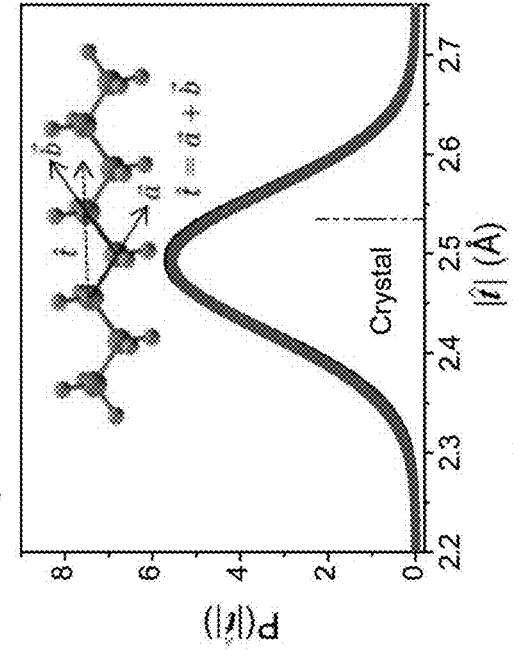
FIG. 7, comprising
Figure 7:
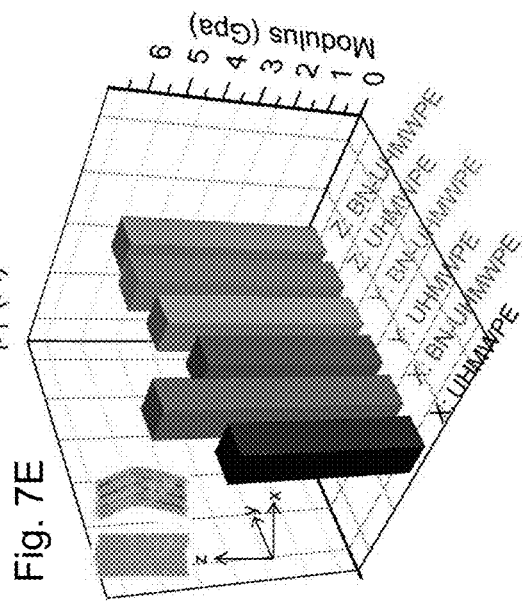
Figure 7:
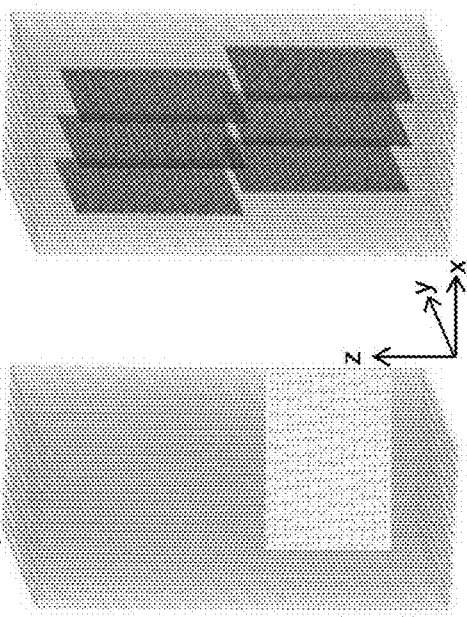
Figure 7:
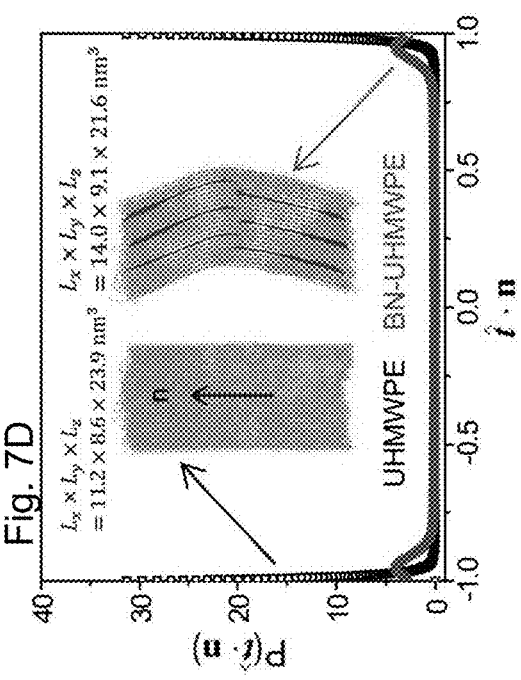

The results discussed above demonstrate that the incorporation of BN nanosheets into UHMWPE enhances its mechanical properties, with a maximum observed at a loading of 20 wt %. In order to understand further the BN doping effect on the mechanical properties of highly aligned UHMWPE sheets, molecular dynamics (MD) simulations of pure UHMWPE and composite sheets (with a loading of 20 wt %) were performed. For the purpose of modeling highly aligned polymer chains, a pure UHMWPE crystal consisting of 47,916 monomeric units (with a molar mass of 1,344,523 g/mol), and a BN-UHMWPE composite were constructed as is shown in FIGS. 7A and 7B. Specifically, covalently attached ethylene monomeric units are systematically constructed on a 2D lattice to form a large sheet (Inset of FIG. 7A). The axis parallel to the polymer chains in this initial configuration is referred to herein as the director axis, n. Such 2D sheets are replicated in the orthogonal dimension, and covalent linkages are created between monomers of the sheets to form a 3D mesh as shown in FIG. 7A. For the composite structures, six BN sheets dimensions of 10×10 nm$^2$ are intercalated within the PE sheets resulting in 20 wt % BN loading in the polymer nanocomposite (FIG. 7B). The above models of UHMWPE and BN-UHMWPE are then subjected to an equilibration protocol described in the methods section, and 50 ns long constant pressure-temperature (NPT) simulations is performed at 1 atm pressure and room temperature for each combination of model system and temperature. The equilibrium densities at room temperature of the UHMWPE and BN-UHMWPE are found to be 0.984 and 1.052 g/cc, respectively. The states equilibrated at room temperature (shown in the inset of FIG. 7D) display a high degree of polymer alignment with sparsely distributed amorphous regions. Specifically, the tangent vector, $\hat{t}$ representing the monomer-monomer alignment is seen to align along the director axis, n. The distribution of $|\hat{t}|$ peaks at 2.50 Å (Inset of FIG. 7C), in close comparison with perfect crystalline monomeric unit to monomeric unit distance of 2.54 Å (FIG. 7C). Similarly, the distribution of angles between tangent vectors and the director axis, $P(\hat{t}\cdot n)$, reveals that pure UHMWPE maintains a very high degree of alignment, as shown in the inset of FIG. 7D. Interestingly, the loading of BN into pure UHMWPE induces misalignment of tangent vectors away from the director axis. The calculated order parameters $\langle S_2 \rangle$ of UHMWPE and BN-dispersed UHMWPE are 0.867 and 0.668, respectively. The equilibrium polymer models are then subjected to external loading as outlined in the inset of FIG. 7E. Independent simulations are carried out to apply mechanical stress along all three directions. The computed elastic moduli along x, y and z directions for both the aligned matrices are presented in FIG. 7E. Despite a lower order parameter for the BN-dispersed UHMWPE composite, the elastic modulus is found to be higher than that of the UHMWPE matrix. The above results indicate that the contribution of BN sheets to the elastic modulus of the composite involves a significant structural change.

Figure 8:
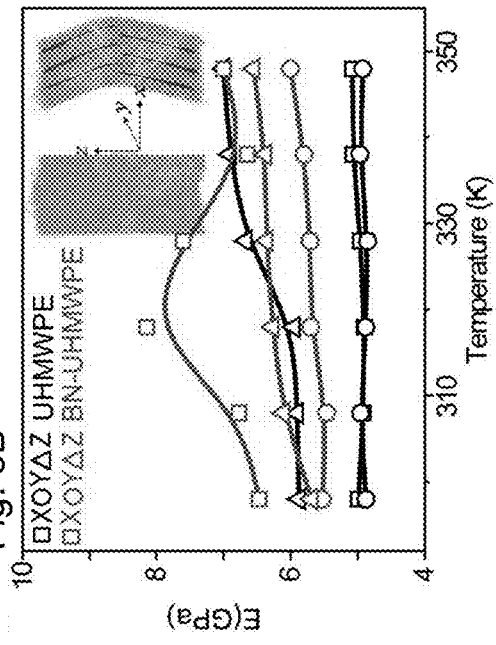
FIG. 8, comprising
Figure 8:
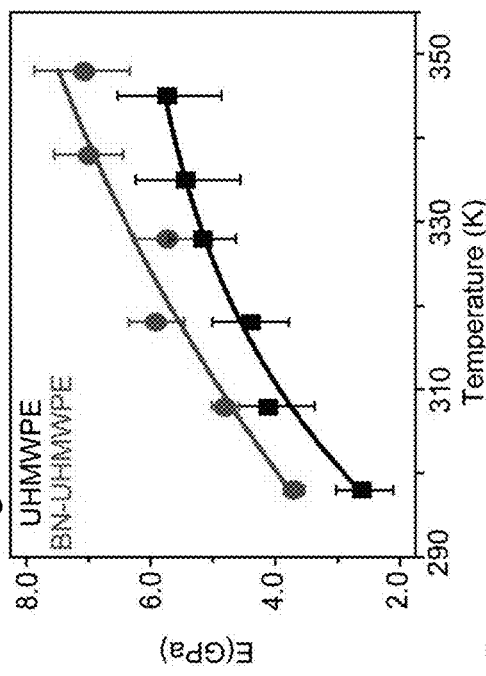
Figure 8:
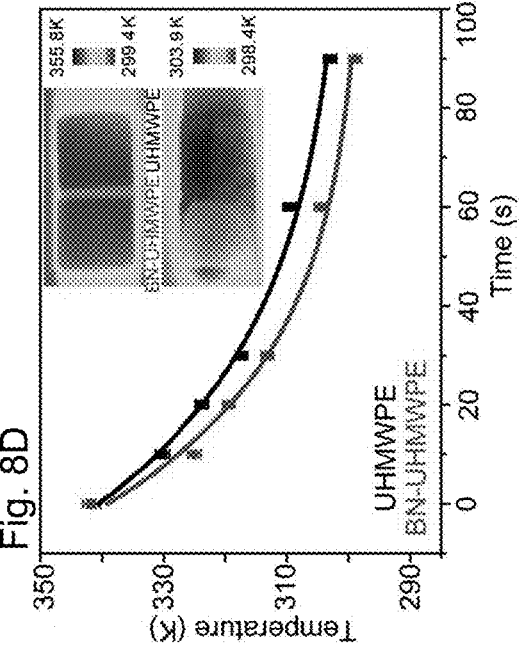
Figure 8:
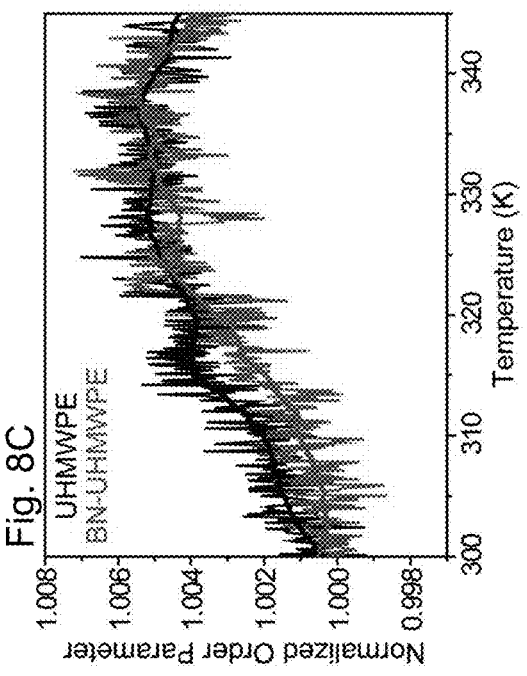
Figure 9:
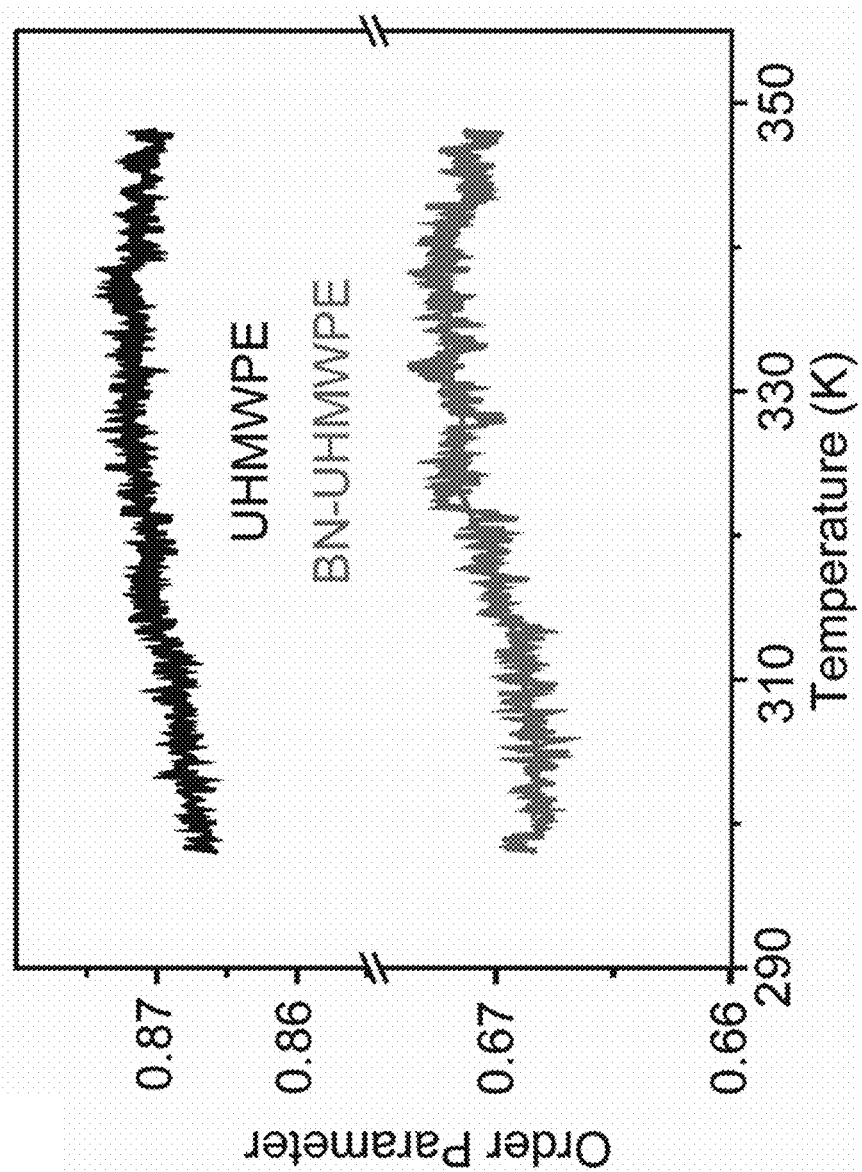
FIG. 9 is a plot showing the variation of order parameter with temperature, characterizing the monomer-monomer alignment of polyethylene with respect to the film direction. The temperature-induced increase in polymer alignment may be responsible for the increased modulus at higher temperature.

The mechanical properties at increasing temperature are studied through in-situ nanoindentation and MD simulations. The Young's modulus increases with the increase of temperature for both highly aligned UHMWPE and BN-UHMWPE sheets (FIGS. 8A and 8B). To understand the mechanistic origins of the increase in modulus at high temperature, it is useful to examine how different molecular segments of polymer chains respond to the temperature. Therefore, heating simulations of both systems were conducted under NPT conditions and the polymer segmental order parameter was analyzed. Results of the normalized order parameter as a function of temperature calculated from united atom simulations are displayed in FIG. 8C (FIG. 9 shows the order parameter $\langle S_2 \rangle$ as a function of temperature). Surprisingly, $\langle S_2 \rangle$ increases with temperature for both the pure UHMWPE and BN sheet-dispersed UHMWPE system. However, the dispersion of BN nanosheets into the polymer matrix is seen to decrease $\langle S_2 \rangle$ compared to the pure UHMWPE. The introduction of BN sheets into a highly ordered polymer matrix is expected to influence (e.g., break) the polymer chain order around its surface. Accordingly, the computed polymer segment-segment coordination number changes dramatically near the BN surface, leading to decreasing values of $\langle S_2 \rangle$ at any given temperature. The counter-intuitive behavior of temperature effects on order parameter (and consequently the mechanical properties) can be understood to be a result of the changes in local ordering of polymer segments. It appears that an increase in temperature helps in overcoming local free energy barriers in a complex polymer network. In this case, C—C bond vectors defining the polymer segments are more likely to reach a higher degree of alignment. Consequently, the order parameter defining the morphology in each system (UHMWPE and BN-UHMWE) increases at higher temperature. Moreover, the increased degree of freedom of polymer segments facilitates the formation of self-assembled crystalline regimes in higher proportions. Collectively, the above discussed mechanisms give rise to enhanced mechanical properties of pure UHMWPE and BN-UHMWPE at higher temperature, rationalizing the experimental findings.

Figure 10:
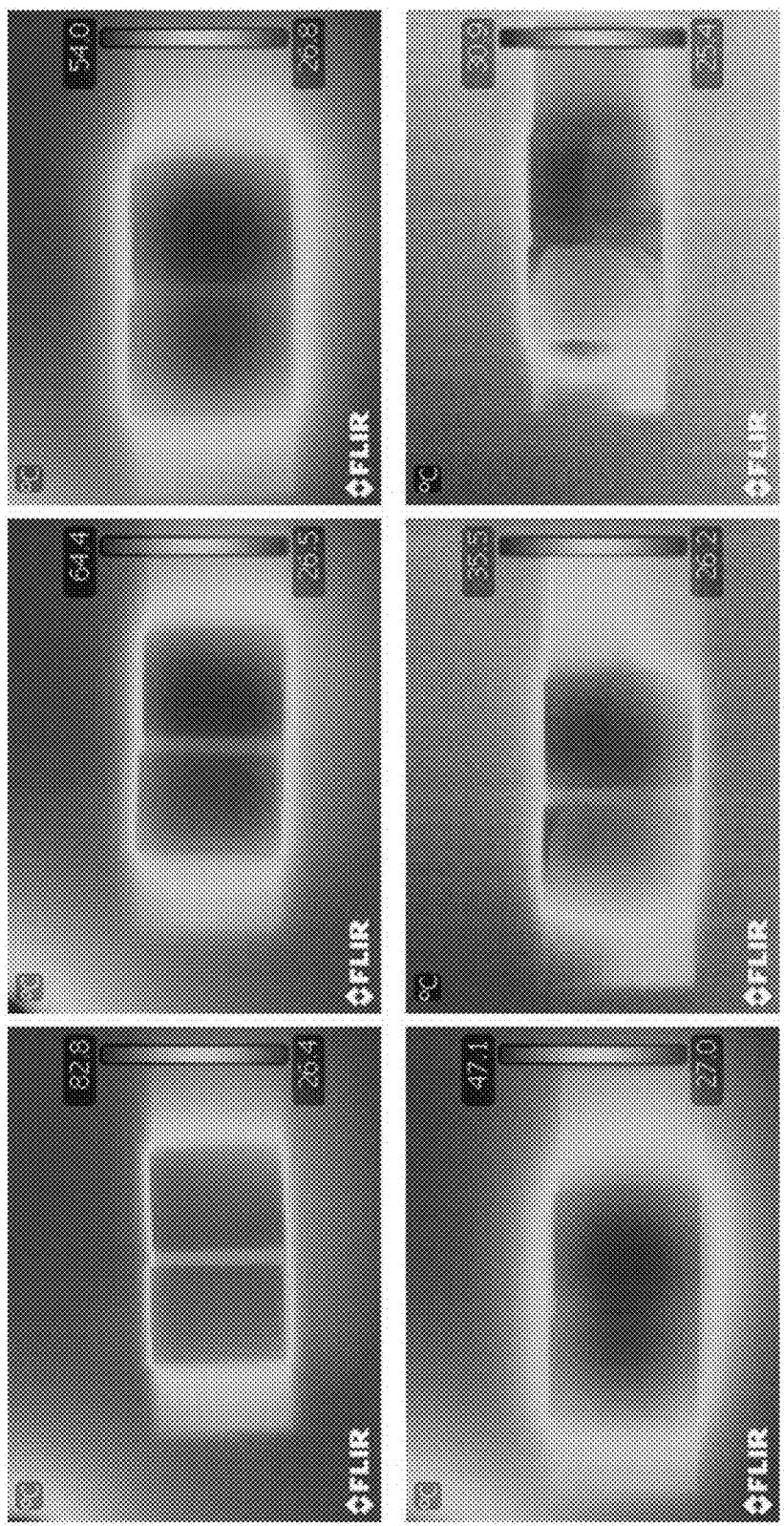
FIG. 10 shows near infrared images taken during the cooling process of BN-UHMWPE composite (left) and pure UHMWPE matrix (right).

The thermal diffusion abilities of UHMWPE and aligned BN-UHMWPE sheets of 20 wt % loading are captured by using the near-infrared camera. The images show similar chromatic aberration throughout the image at the initial stage, indicating the same starting temperature. The sheets are then naturally cooled to room temperature, and the difference in chromatic aberration becomes larger between the two samples with the extension of the cooling time (FIG. 8D and FIG. 10). While the BN-UHMWPE composite sheets possess higher thermal conductivity, their heat diffusion is much faster than that of the pure UHMWPE. Therefore, the temperature of BN-UHMWPE composite sheets would be lower than that of the pure UHMWPE. The temperature variation can be resolved from the cooling evolution of near-infrared images. The temperature difference can reach up to 2.2 K after 90 s, indicating a faster thermal conductivity of the BN-UHMWPE composite material (FIG. 8D).

BN nanosheets-doped UHMWPE composites with high degree of alignment through a thermal-mechanical tension process have been investigated. The BN nanosheets play an important role in uniformly improving the mechanical properties of UHMWPE, compared to the bulk BN loading. This is due in part to the strong interfacial alignment of polymer chains on the surface of BN sheets. Furthermore, the aligned UHMWPE sheets exhibit a higher mechanical modulus than that of UHMWPE in which the polymer chains are randomly oriented with respect to each other. In-situ nanoindentation also shows an increase of mechanical properties with temperature. MD simulations suggest that, at elevated temperature, the local free energy barriers in the polymer network are overcome, and the polymer segments are more likely to reach a higher degree of alignment. Given that the temperatures used are well below melting, the increased degree of freedom of polymer segments facilitates the formation of the self-assembled crystals. These collectively give rise to enhanced mechanical properties of UHMWPE and BN-UHMWPE, at high temperatures. Finally, the aligned UHMWPE sheets show fast thermal diffusion and higher thermal conductivity. These findings could likely expedite the use of UHMWPE-based materials for protective purposes (ballistic panels, body armors, etc.) over a broad temperature range.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

We claim:

1. A polymer composite material, comprising:
   a polymer material having a plurality of polymer chains, wherein the polymer chains are highly aligned;
   a planar material, wherein the amount of the planar material is between 10 wt % and 40 wt % of the composite material; and
   wherein the degree of alignment of the polymer chains is between 80% and 100%.

2. The polymer composite material of claim 1, wherein the polymer material comprises a polymer selected from the group consisting of a polyethylene, a polyamide, an aramid, a polycarbonate, a polystyrene, a fluoropolymer, a polyester, an epoxy, a polybenzazole, and combinations or co-polymers thereof.

3. The polymer composite material of claim 1, wherein the polymer material is selected from the group consisting of low density polyethylene, high density polyethylene, and ultra-high molecular weight polyethylene.

4. The polymer composite material of claim 1, wherein the planar material is selected from the group consisting of graphene, hexagonal boron nitride, silicene, germanene, phosphorene, $MoS_2$, $TiS_2$, $WS_2$, $VS_2$, $TiSe_2$, $MoSe_2$, $WSe_2$, $TaSe_2$, $NbSe_2$, $NiTe_2$, $Bi_2Te_3$, and combinations thereof.

5. The polymer composite material of claim 1, wherein the planar material is graphene, hexagonal boron nitride, or a combination thereof.

6. The polymer composite material of claim 1, wherein the amount of planar material is about 20 wt % of the composite material.

7. A ballistic resistant material comprising the polymer composite material of claim 1.

8. Armor comprising the ballistic resistant material of claim 7.

9. The polymer composite material of claim 1, wherein the polymer composite material exhibits faster thermal diffusion and higher thermal conductivity than the polymer material.

10. The polymer composite material of claim 1, wherein the polymer composite material exhibits impact load dampening.

11. An article comprising stacked sheets of the polymer composite material of claim 1.

12. The polymer composite material of claim 1, wherein the polymer composite material is disposed over an inert substrate.

13. The polymer composite material of claim 1, wherein the polymer composite material exhibits higher strength and higher tensile modulus than the polymer material.

14. A slice, stick, wire, fiber, brick, fabric, or film, comprising the polymer composite material of claim 1.

15. The polymer composite material of claim 1, wherein the elongation at break of the polymer composite material is between 250% and 550%.

16. An article of clothing, cover, or blanket comprising the polymer composite material of claim 1.

17. A fabric composing the polymer composite material of claim 1, wherein the polymer composite material is unattached to or juxtaposed with the fabric.

18. A helmet, panel for military vehicle, protective shield, or freestanding structure comprising the polymer composite material of claim 1.

19. The polymer composite material of claim 1, wherein the Young's modulus of the polymer composite material at a degree of alignment of 80 to 100% is between 3.8 and 4.5.

* * * * *